United States Patent
Roche et al.

(10) Patent No.: US 11,772,524 B2
(45) Date of Patent: Oct. 3, 2023

(54) VEHICLE SEAT

(71) Applicant: FAURECIA Sièges d'Automobile, Nanterre (FR)

(72) Inventors: Sylvain Roche, Varennes Changy (FR); David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 6 days.

(21) Appl. No.: 17/704,199

(22) Filed: Mar. 25, 2022

(65) Prior Publication Data

US 2022/0314843 A1      Oct. 6, 2022

(30) Foreign Application Priority Data

Mar. 30, 2021 (FR) ...................... 2103237

(51) Int. Cl.
 *B60N 2/12* (2006.01)
 *B60N 2/02* (2006.01)
 *B60N 2/06* (2006.01)

(52) U.S. Cl.
 CPC ............ *B60N 2/12* (2013.01); *B60N 2/0232* (2013.01); *B60N 2/06* (2013.01)

(58) Field of Classification Search
 CPC .......... B60N 2/12; B60N 2/0232; B60N 2/06; B60N 2/22; B60N 2/3011; B60N 2/3065; B60N 2/309; B60N 2/366; B60N 2002/0236
 USPC ...................................................... 297/344.1
 See application file for complete search history.

(56) References Cited

U.S. PATENT DOCUMENTS

| | | | |
|---|---|---|---|
| 5,722,727 A | 3/1998 | Unckrich | |
| 8,496,294 B2* | 7/2013 | Holdampf | B60N 2/309 296/65.09 |
| 11,167,666 B2 | 11/2021 | Epaud | |
| 2019/0092191 A1 | 3/2019 | Bouzid | |
| 2020/0101869 A1 | 4/2020 | Bouzid | |
| 2022/0118889 A1* | 4/2022 | Susko | B60N 2/005 |

FOREIGN PATENT DOCUMENTS

| | | |
|---|---|---|
| DE | 202005021281 U1 | 9/2007 |
| DE | 102017215929 A1 | 3/2019 |
| EP | 2363316 A1 | 9/2011 |
| FR | 3086598 A1 | 4/2020 |
| WO | 2006128290 A1 | 12/2006 |
| WO | WO2021163659 * | 2/2021 |

* cited by examiner

*Primary Examiner* — Mark R Wendell
(74) *Attorney, Agent, or Firm* — BARNES & THORNBURG LLP

(57) ABSTRACT

A vehicle seat comprising: a seat base frame, anchoring means for anchoring to the floor of a vehicle, a backrest pivotably hinged to the seat base frame, a substructure pivotably hinged to the anchoring means and to the backrest, a front connecting rod pivotably hinged to the anchoring means and to the seat base frame, a sector gear pivotably hinged to the anchoring means, an irreversible electric motor configured to cause rotation of the sector gear relative to the anchoring means, a first locking means for locking the rotation of the substructure relative to the anchoring means, a second locking means for locking the rotation of the backrest relative to the substructure, a third locking means for locking the rotation of the front connecting rod relative to the sector gear.

19 Claims, 12 Drawing Sheets

VEHICLE SEAT

PRIORITY CLAIM

This application claims priority to French Patent Application No. FR2103237, filed Mar. 30, 20221, which is expressly incorporated by reference herein.

BACKGROUND

The present disclosure relates to a seat for a vehicle, and in particular for a motor vehicle, as well as to a vehicle equipped with such a seat.

SUMMARY

According to the present disclosure, a vehicle seat comprises a seat base frame having a front edge and a rear edge interconnected by a first side edge and a second side edge, anchoring means for anchoring the seat to the floor of a vehicle, connecting means for connecting the seat base frame to the anchoring means, enabling movement of the seat base frame relative to the anchoring means at least in the longitudinal direction and in the vertical direction of the seat, a backrest hinged to the seat base frame near its rear edge so as to pivot about a first transverse axis of the seat, and a substructure hinged to the anchoring means so as to pivot about a second transverse axis of the seat and hinged to the backrest so as to pivot about a third transverse axis of the seat.

In illustrative embodiments, the connecting means comprise:
  a front connecting rod having a first longitudinal end and a second longitudinal end, the front connecting rod being hinged to the anchoring means near its first longitudinal end so as to pivot about a fourth transverse axis of the seat and hinged to the seat base frame near its second longitudinal end so as to pivot about a fifth transverse axis of the seat, near its front edge,
  a sector gear hinged to the anchoring means so as to pivot about the fourth transverse axis of the seat.

In illustrative embodiments, the seat further comprises an irreversible electric motor configured for:
  causing rotation of the sector gear relative to the anchoring means about the fourth transverse axis, when activated, and
  preventing rotation of the sector gear relative to the anchoring means about the fourth transverse axis, when inactivated.

In illustrative embodiments, the seat further comprises:
a first locking means able to transition:
  from a locked state, in which the first locking means prevents rotation of the substructure relative to the anchoring means of the seat about the second transverse axis, to
  an unlocked state, in which the first locking means allows rotation of the substructure relative to the anchoring means of the seat about the second transverse axis, and vice versa,
a second locking means able to transition:
  from a locked state, in which the second locking means prevents rotation of the backrest relative to the substructure about the third transverse axis, to
  an unlocked state, in which the second locking means allows rotation of the backrest relative to the substructure (6) about the third transverse axis, and vice versa,
a third locking means able to transition:
  from a locked state, in which the third locking means prevents rotation of the front connecting rod relative to the sector gear about the fourth transverse axis by fixedly connecting the front connecting rod to the sector gear, to
  an unlocked state, in which the third locking means allows rotation of the front connecting rod relative to the sector gear about the fourth transverse axis, and vice versa.

According to optional features of the present disclosure, taken alone or in combination:
  the first locking means comprises an actuator, and in particular an electric motor, configured to cause the automatic transition of the first locking means from its locked state to its unlocked state, and vice versa;
  the first locking means further comprises a first manual control means configured to cause the transition of the first locking means from its locked state to its unlocked state and vice versa by a manual action by a user on the first manual control means,
  the first manual control means comprises a handle mounted so as to pivot relative to the substructure about a seventh transverse axis of the seat;
  the second locking means comprises an actuator, and in particular an electric motor, configured to cause the automatic transition of the second locking means from its locked state to its unlocked state, and vice versa;
  the actuator of the first locking means is the actuator of the second locking means;
  the second locking means further comprises a second manual control means configured to cause the transition of the second locking means from its locked state to its unlocked state and vice versa by a manual action by a user on the second manual control means;
  the third locking means comprises:
    a first locking part integral with the front connecting rod and hinged to the front connecting rod about an eighth transverse axis of the seat, and having a first interlocking part,
    a second locking part integral with the sector gear and fixed relative to the sector gear, and having a second interlocking part, configured to fit into the first interlocking part of the first locking part so as to prevent rotation of the front connecting rod relative to the sector gear about the fourth transverse axis of the seat, and:
  the locked state of the third locking means corresponds to at least one locking position of the second locking part relative to the first locking part in which the first interlocking part of the first locking part is fitted into the second interlocking part of the second locking part so as to prevent rotation of the front connecting rod relative to the sector gear about the fourth transverse axis of the seat,
  the unlocked state of the third locking means corresponds to at least one unlocking position of the second locking part relative to the first locking part in which the first interlocking part of the first locking part is separated from the second interlocking part of the second locking part so as to allow rotation of the front connecting rod relative to the sector gear about the fourth transverse axis of the seat;
  the second locking part is made as one piece with and of the same material as the sector gear;
  the first interlocking part comprises a first recess and/or a first projection, in particular adjacent to the first recess, and the second interlocking part comprises a second projection configured to fit together with the first recess of the first interlocking part with possible interlocking clearance and/or a second recess, in particular adjacent to the second projection, configured to fit together with the first projection of the first interlocking part with possible interlocking clearance;

the third locking means further comprises: a cam hinged to the front connecting rod so as to pivot about a ninth transverse axis of the seat, and a cam track integral with and fixed relative to the first locking part, and in particular made as one piece with and of the same material as the first locking part, the cam and the cam track being configured to cooperate in order to cause the pivoting of the first locking part relative to the front connecting rod about the eighth transverse axis of the seat between the at least one locking position of the first locking part relative to the second locking part and the at least one unlocking position of the first locking part relative to the second locking part;

the cam has a first bearing surface and a second bearing surface, and the cam track has a first abutment surface and a second abutment surface, the rotation of the first locking part relative to the front connecting rod about the eighth transverse axis being driven in a first direction of rotation, advantageously corresponding to the transition from the at least one locking position to the at least one unlocking position of the first locking part relative to the second locking part, by the pressing of the first bearing surface of the cam against the first abutment surface of the cam track, and the rotation of the first locking part relative to the front connecting rod about the eighth transverse axis being driven in a second direction of rotation, opposite to the first direction of rotation, advantageously corresponding to the transition from the at least one unlocking position to the at least one locking position of the first locking part relative to the second locking part, by the pressing of the second bearing surface of the cam against the second abutment surface of the cam track;

the third locking means further comprises a third manual control means configured to cause the transition of the third locking means from its locked state to its unlocked state and vice versa by a manual action by a user on the third manual control means;

the third manual control means of the third locking means comprises the handle of the first manual control means of the first locking means;

the third locking means comprises an actuating part integral with and fixed relative to the cam, and mounted on the front connecting rod so as to pivot about the ninth transverse axis of the seat, the actuating part being connected to the manual control means, for example via a rigid cable, such that a manual action by a user on the third manual control means causes the actuating part to pivot relative to the front connecting rod about the ninth transverse axis of the seat, and the cam to pivot relative to the front connecting rod about the ninth transverse axis of the seat;

the cam and the actuating part are arranged one on either side of the front connecting rod in the transverse direction of the seat, and in particular with the actuating part positioned between the first side edge and the second side edge of the seat base frame in the transverse direction of the seat;

the actuating part has a first arm and a second arm interconnected at a joining area near one of their respective longitudinal ends, for example so as to have substantially an L or V shape, with the first arm fixed to the cam and the second arm connected to the third manual control means, and in particular by means of the rigid cable, the actuating part being hinged to the front connecting rod so as to pivot about the ninth transverse axis of the seat at the joining area between the first arm and the second arm of the actuating part;

the third locking means further comprises an elastic means, for example such as a spring, configured to urge the third locking means into its locked state.

Another aspect of the present disclosure proposes a vehicle comprising a seat according to one of the embodiments of the present disclosure.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1A:
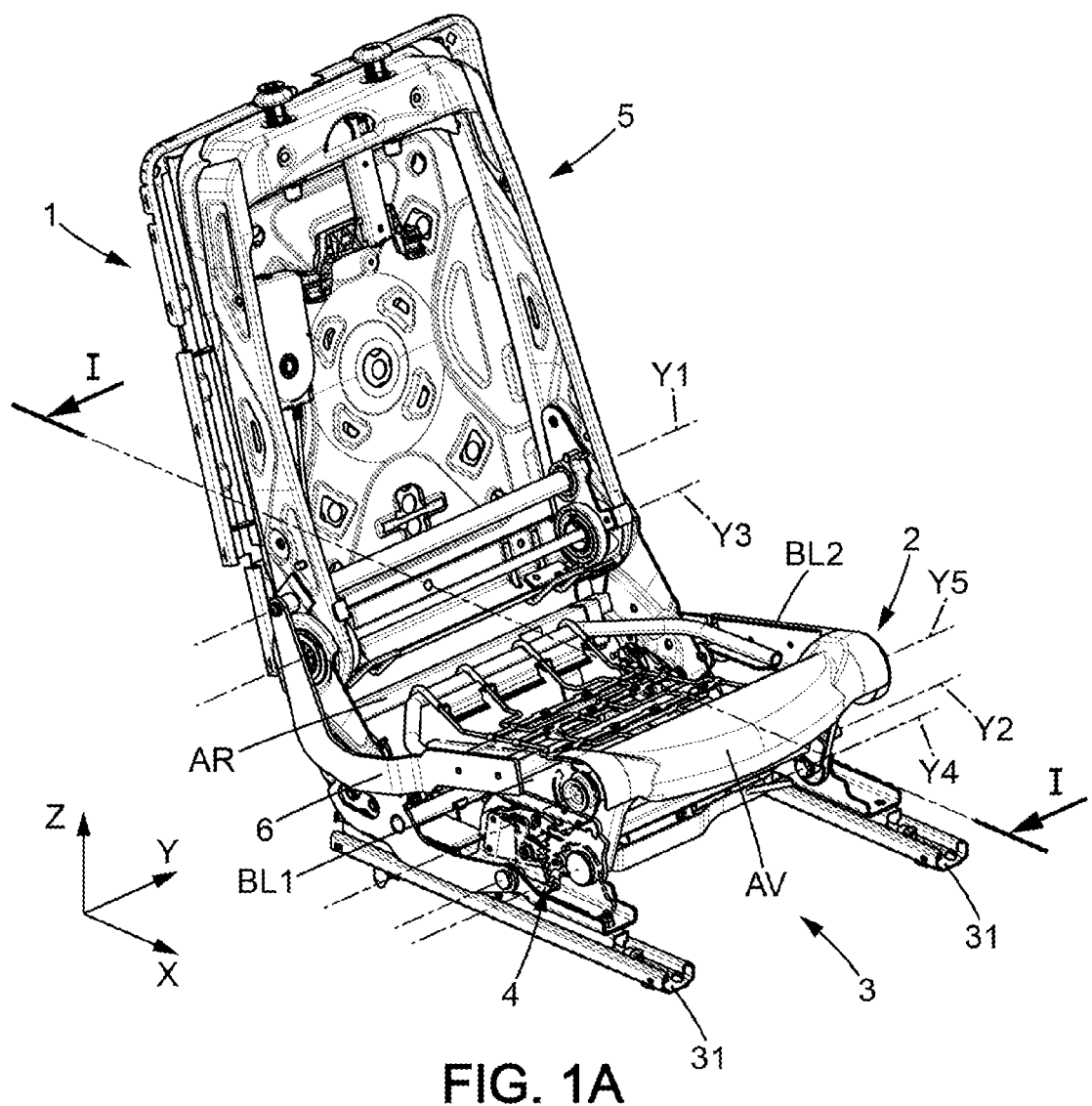
FIG. 1A shows a perspective view of a vehicle seat according to one embodiment of the present disclosure, in a first configuration referred to as nominal.

Throughout this application, the spatial directions are defined as follows:

the longitudinal direction X of the seat corresponds to the direction in which the seat slides relative to the floor of the vehicle along slide rails, when the seat comprises slide rails as anchoring means for anchoring to the floor of the vehicle, received on the seat base frame of the seat, as represented in the exemplary embodiments in the figures, the vertical direction Z of the seat corresponds to the direction perpendicular to the plane of the vehicle floor to which the seat is fixed, also perpendicular to the longitudinal direction X of the seat defined above, as represented in the exemplary embodiments in the figures, the transverse direction Y of the seat is the direction perpendicular to the longitudinal direction and vertical direction, as represented in the exemplary embodiments in the figures.

Similarly, a seat plane is defined according to the directions of the seat that it contains.

An axis is defined as a straight line in a determined direction. For example, a transverse axis is an axis along the transverse direction.

Front and rear are also understood to mean along the longitudinal direction of the seat, with an orientation from the rear edge of the seat base frame, to which a seat backrest is generally hinged, towards the front edge of the seat base frame.

Similarly, upper (above) and lower (below) are understood to mean along the vertical direction of the seat, with an orientation from the anchoring means for anchoring to the floor of the vehicle, and in particular the slide rails, towards the seat base frame of the seat.

Finally, throughout this application, substantially longitudinal, transverse, or vertical, are understood to mean an orientation relative to the longitudinal direction, vertical direction, or transverse direction, forming an angle of less than 30° which may advantageously be zero.

Similarly, the term substantially parallel is understood to mean an orientation relative to a given element, forming an angle of less than 30° which may advantageously be zero.

The present disclosure relates to a vehicle seat 1 comprising:

a seat base frame 2 having a front edge AV and a rear edge AR interconnected by a first side edge BL1 and a second side edge BL2, anchoring means 3 for anchoring the seat base frame 2 to the floor of a vehicle, connecting means 4 for connecting the seat base frame 2 to the anchoring means 3, configured so as to allow movement of the seat base frame 2 relative to the anchoring means 3 at least in the longitudinal direction X and in the vertical direction Z of the seat 1, a backrest 5, hinged to the seat base frame 2 near its rear edge AR so as to pivot about a first transverse axis Y1 of the seat 1, a substructure 6 hinged to the anchoring means 3 so as to pivot about a second transverse axis Y2 of the seat 1 and hinged to the backrest 5 so as to pivot about a third transverse axis Y3 of the seat 1.

According to the present disclosure, the connecting means 4 comprise:

a front connecting rod 41 having a first longitudinal end E41 and a second longitudinal end E41', the front connecting rod 41 being hinged to the anchoring means 3 near its first longitudinal end E41 so as to pivot about a fourth transverse axis Y4 of the seat 1 and hinged to the seat base frame 2 near its second longitudinal end E41' so as to pivot about a fifth transverse axis Y5, near its front edge AV, a sector gear 42 hinged to the anchoring means 3 so as to pivot about the fourth transverse axis Y4 of the seat 1.

According to the present disclosure, the seat 1 further comprises an irreversible electric motor M configured for:

causing the rotation of the sector gear 42 relative to the anchoring means 3 about the fourth transverse axis Y4, when activated, and preventing the rotation of the sector gear 42 relative to the anchoring means 3 about the fourth transverse axis Y4, when inactivated.

According to the present disclosure, the seat 1 further comprises:

a first locking means 7 able to transition:

from a locked state, in which the first locking means 7 prevents rotation of the substructure 6 relative to the anchoring means 3 of the seat 1 about the second transverse axis Y2, to an unlocked state, in which the first locking means 7 allows rotation of the substructure 6 relative to the anchoring means 3 of the seat 1 about the second transverse axis Y2, and vice versa, a second locking means 8 able to transition:

from a locked state, in which the second locking means 8 prevents rotation of the backrest 5 relative to the substructure 6 about the third transverse axis Y3, to an unlocked state, in which the second locking means 8 allows rotation of the backrest 5 relative to the substructure 6 about the third transverse axis Y3, and vice versa, a third locking means 9 able to transition:

from a locked state, in which the third locking means 9 prevents rotation of the front connecting rod 41 relative to the sector gear 42 about the fourth transverse axis Y4 by fixedly connecting the front connecting rod 41 to the sector gear 42, to an unlocked state, in which the third locking means 9 allows rotation of the front connecting rod 41 relative to the sector gear 42 about the fourth transverse axis Y4, and vice versa.

Thus, with the seat 1 according to the present disclosure, when the irreversible motor M is deactivated, or nonfunctional because damaged for example, thus preventing rotation of the sector gear 42 about the fourth transverse axis Y4 of the seat, it is possible to move the seat base frame 2 relative to the anchoring means 3 in the longitudinal direction X and vertical direction Z of the seat 1, by transitioning the third unlocking means 9 from its locked state to its unlocked state so as to allow rotation of the front connecting rod 41 relative to the anchoring means 3 about the fourth transverse axis Y4.

In order to allow movement of the substructure 6 relative to the anchoring means 3 or to allow simultaneous movement of the backrest 5 relative to the substructure 6 and to the seat base frame 2, so as to move it closer to or further away from the seat base frame 2, the second locking means 8, respectively the first locking means 7, can each also transition from their locked state to their unlocked state.

The seat 1 according to the present disclosure advantageously employs a single irreversible electric motor M to drive the movements of the seat base frame 2 and substructure 6 relative to the anchoring means 3 as well as of the backrest 5 relative to the seat base frame 2 and substructure 6, and not one or more reversible motors as in the comparative vehicle seats.

An irreversible electric motor provides higher torque than a reversible motor. In particular, as explained above, for a substantially equivalent size and power, an irreversible electric motor can provide a motor torque at least twice that of the motor torque provided by a reversible electric motor. The irreversible electric motor M of the seat according to the present disclosure may for example provide a motor torque greater than or equal to 40 Nm, and preferably greater than or equal to 50 Nm, while the reversible electric motors of comparable vehicle seats generally provide a motor torque of around 25 Nm.

As a result, the movements of the seat base frame 2 and substructure 6 relative to the anchoring means 3 as well as of the backrest 5 relative to the seat base frame 2 and substructure 6, to transition from one configuration to another of the seat 1, are easily driven by the single irreversible electric motor M. There is no need to lighten the elements of the seat 1 and in particular its seat base frame 2, its substructure 6, or its backrest 5 so that the electric motor M is able to drive the movements of the seat base frame 2 and substructure 6 relative to the anchoring means 3 as well as of the backrest 5 relative to the seat base frame 2 and substructure 6, and despite the smaller lever arm between the two longitudinal ends E41, E41' of the front connecting rod 41. This makes it possible to simplify the design of the seat 1 according to the present disclosure and to reduce its production cost.

In addition, the electric motor M being irreversible, when the motor is inactivated, for example when it is not supplied with electricity or when it is not working, for example if it has been damaged, and the third locking means 9 is in its locked state, the electric motor M prevents rotation of the front connecting rod 41 relative to the anchoring means 3 about the fourth transverse axis Y4 at its first longitudinal end E41, and thus makes it possible to ensure that the seat base frame 2 is retained in position relative to the anchoring means 3. Unlike comparable vehicle seats, the seat 1 according to the present disclosure does not require additional locking means, in particular electric, for locking the retention in position of the seat base frame 2 relative to the anchoring means 3 after its movement driven by the electric motor M, which also makes it possible to simplify its design and reduce its production cost.

The seat 1 according to the present disclosure can easily assume different configurations depending on the needs of the user(s) of the vehicle receiving the seat 1 according to the present disclosure.

The seat 1 may for example assume what is called a nominal configuration, similar to the one described above in the introduction to this application, and represented in the exemplary embodiments of FIGS. 1A to 1E.

As can be seen in the exemplary embodiments of FIGS. 1A to 1E, in this nominal configuration, the seat base frame 2 may extend substantially along the longitudinal direction X of the seat 1, substantially parallel to the floor of the vehicle receiving the seat 1. A user can thus sit on the seat 1 according to the present disclosure, in particular during a ride in the vehicle.

In such a configuration, the front connecting rod 41 may be configured so as to extend substantially along the vertical direction Z of the seat 1, with its second longitudinal end E41' positioned above its first longitudinal end E41 in the vertical direction Z of the seat 1.

The first 7, second 8, and third 9 locking means may advantageously be in their locked state.

Figure 2A:
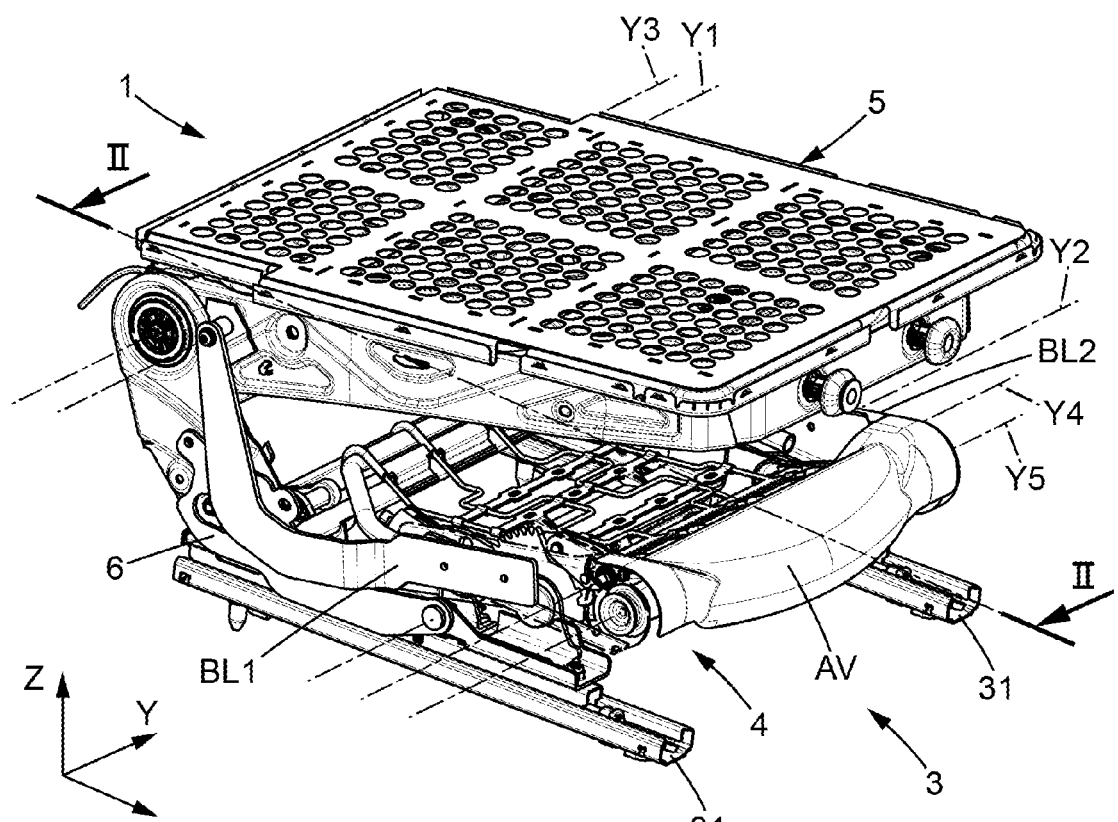
FIG. 2A shows a perspective view of a vehicle seat according to one embodiment of the present disclosure, in a second configuration referred to as flat floor.
Figure 2B:
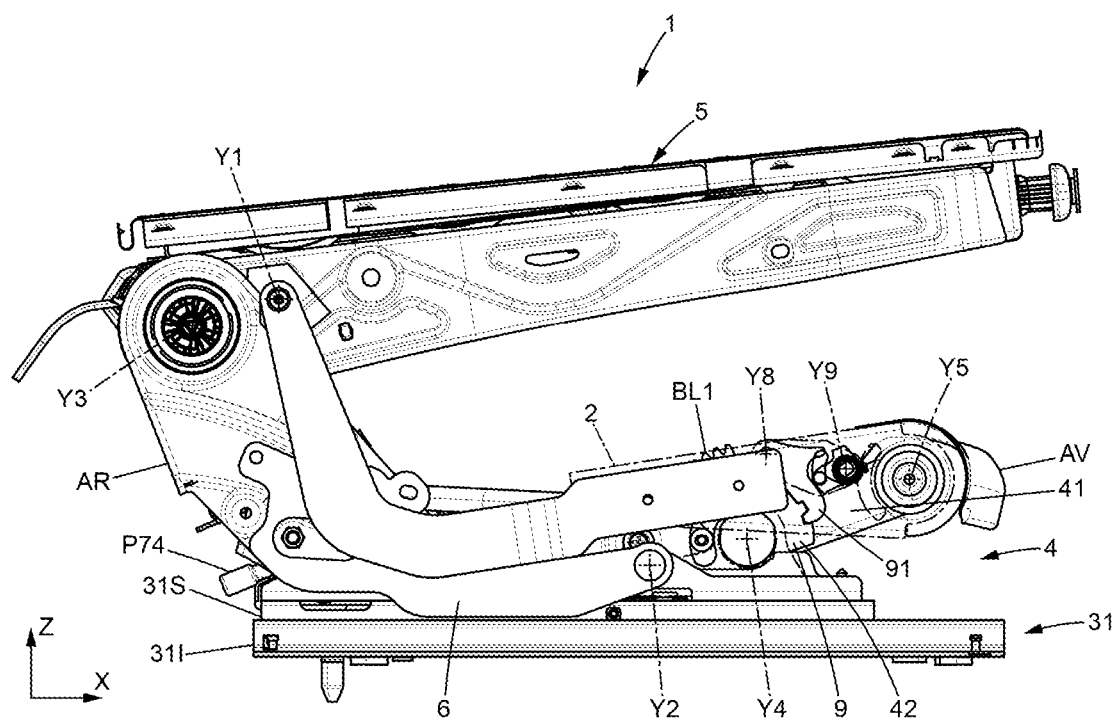
FIG. 2B shows a right view of the seat of FIG. 2A, in which certain elements have been made transparent.
Figure 2C:
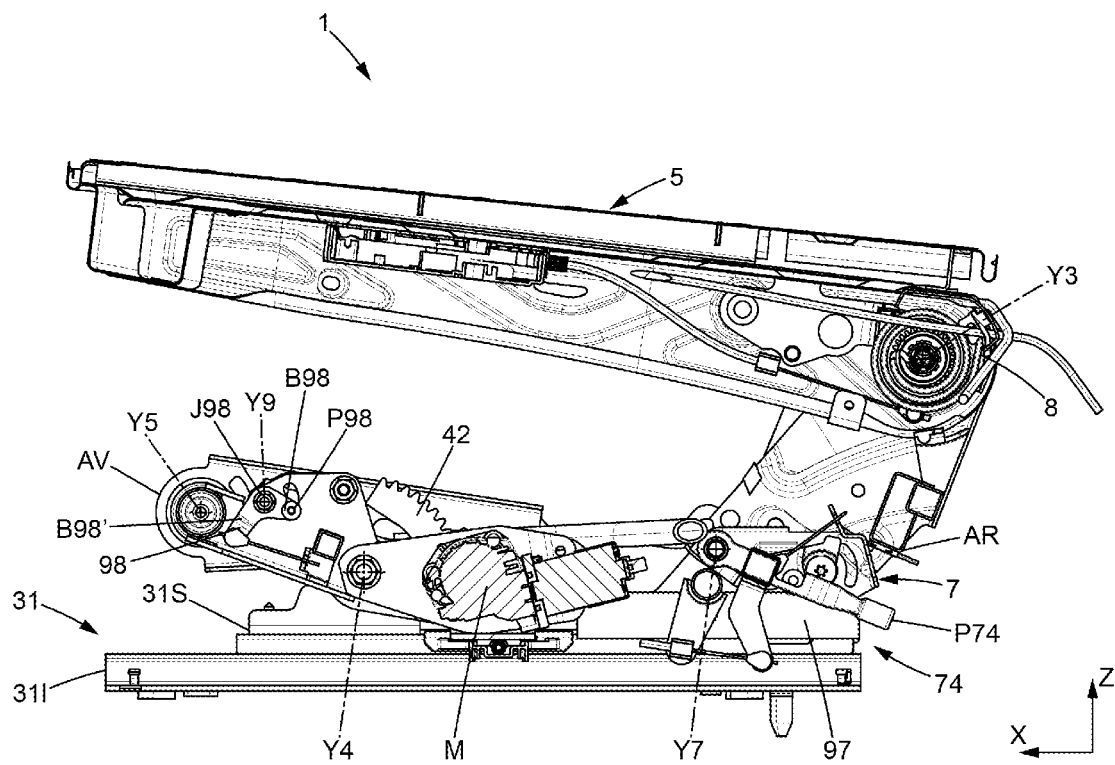
FIG. 2C shows a section view along line II-II of FIG. 2A of the seat of FIG. 2A.

The seat 1 may for example also assume what is called a flat floor configuration, similar to that described above in this application, and represented in the exemplary embodiments of FIGS. 2A to 2C.

As can be seen in the exemplary embodiments of FIGS. 2A to 2C, in this flat floor configuration, the backrest 5 may be folded down against the seat base frame 2, extending substantially parallel to it, and the seat base frame 2 may also extend substantially along the longitudinal direction X of the seat 1, substantially parallel to the floor of the vehicle receiving the seat 1 while having been moved forward in the longitudinal direction X of the seat 1 and downward in the vertical direction Z of the seat 1 relative to its position in the nominal configuration. Such a flat floor configuration advantageously makes it possible to reduce the size of the seat in its vertical direction, and for example in order to be able to place one or more loads on the backrest 5 folded down against the seat base frame 2, in particular when the seat is located at the rear of a vehicle, just in front, in the longitudinal direction of the vehicle, of a rear loading compartment of the vehicle.

The first 7 and the third 9 locking means may advantageously be in their locked state while the second locking means 8 may be in its locked state or in its unlocked state.

The transition from the nominal configuration to the flat floor configuration, or vice versa, is achieved by means of the activated electric motor M, which drives the rotation of the sector gear 42 and therefore of the front connecting rod 41 relative to the anchoring means 3 about the fourth transverse axis Y4 of the seat 1 at its first longitudinal end E41, the third locking means 9 being in its locked state. In addition, the second locking means 8 is in its unlocked state while the first 7 and third 9 locking means are in their locked state. Thus, due to the action of the seat base frame 2 on the backrest 5 via their hinge along the first transverse axis Y1, the rotation of the front connecting rod 41 about the fourth transverse axis Y4 simultaneously causes movement of the seat base frame 2 relative to the anchoring means 3 and pivoting of the backrest 5 relative to the seat base frame 2 about the first transverse axis Y1 and relative to the substructure 6 about the second transverse axis Y2 so as to move the backrest closer 5 to the seat base frame 2, and in particular due to the high torque delivered by the irreversible electric motor M. The moment the electric motor M stops, the seat base frame 2 is locked in the desired configuration, the electric motor M being irreversible.

In order for the electric motor M to ensure rotation of the sector gear 42 relative to the anchoring means 3 about the fourth transverse axis Y4, the sector gear 42 may comprise a plurality of teeth D42, configured to mesh with the teeth DP of a toothed pinion D rotated by means of the electric motor M, possibly via a geared motor R.

Figure 3A:
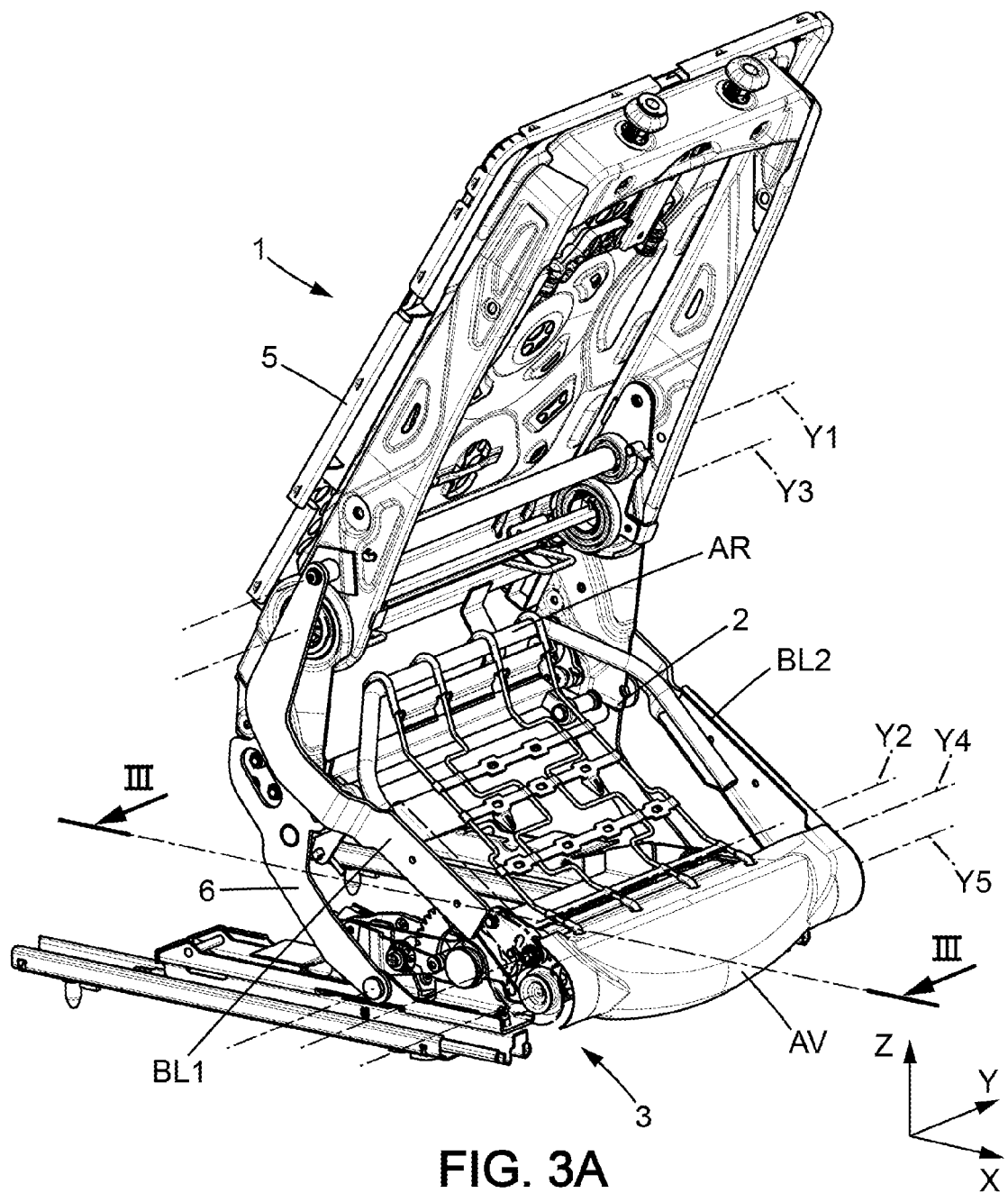
FIG. 3A shows a perspective view of a vehicle seat according to one embodiment of the present disclosure, in a third configuration referred to as easy entry.
Figure 3B:
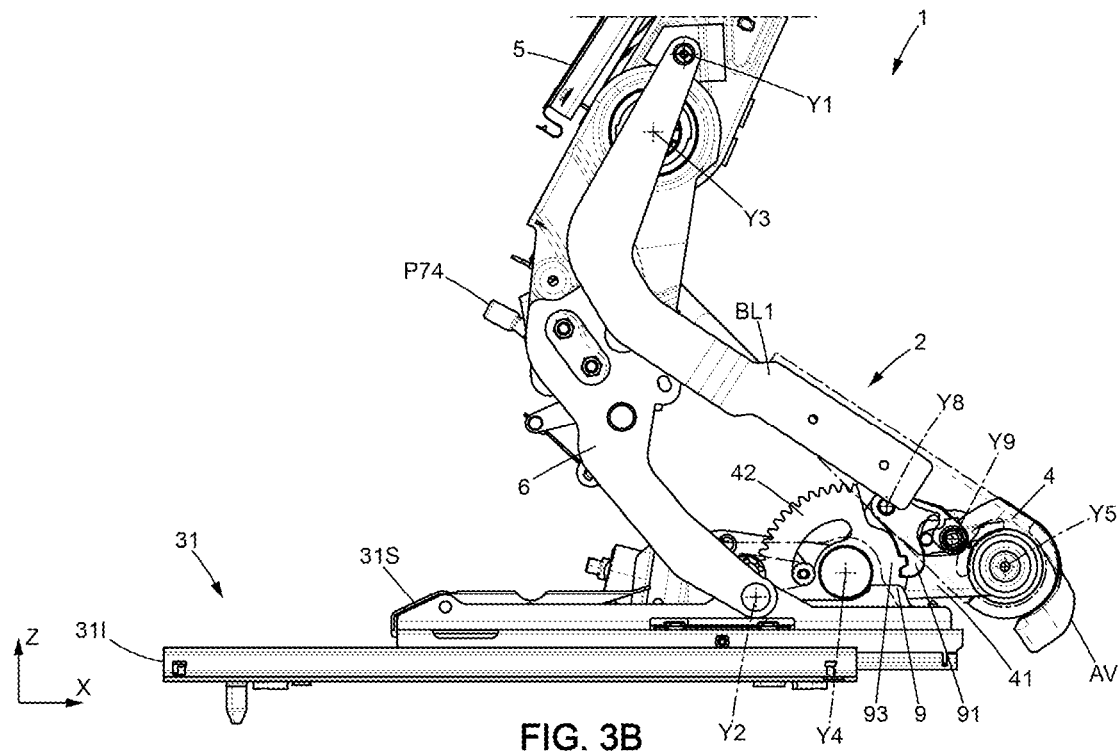
FIG. 3B shows a right view of the seat of FIG. 3A, in which certain elements have been made transparent.
Figure 3C:
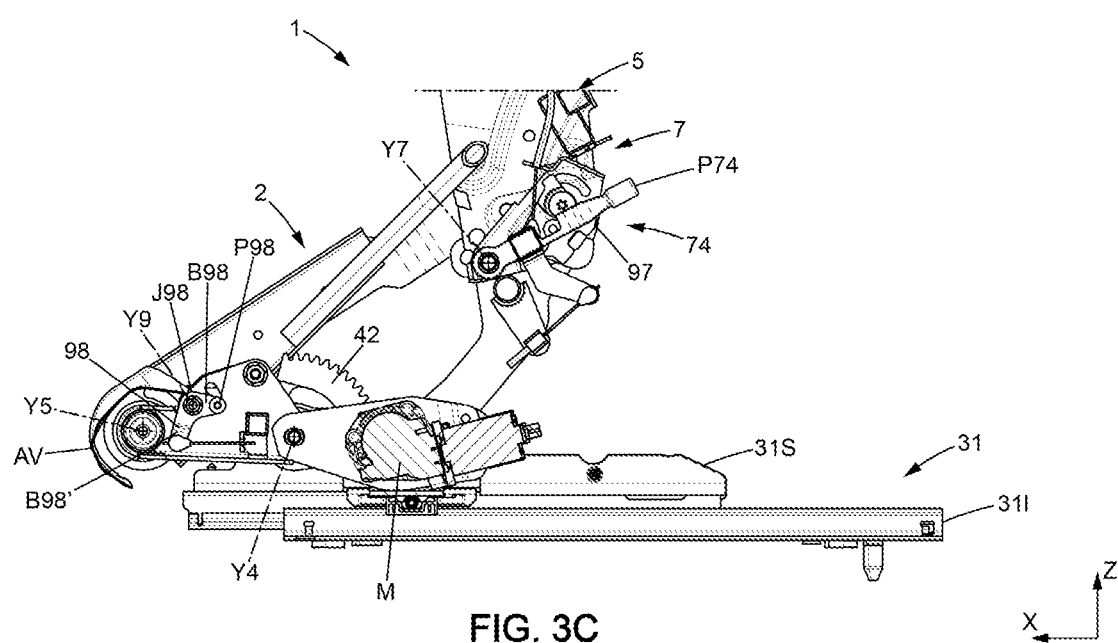
FIG. 3C shows a section view along line III-III of FIG. 3A of the seat of FIG. 3A.

The seat may for example also assume what is referred to as an easy entry configuration, similar to that described above in the introduction to this application, and represented in the exemplary embodiments of FIGS. 3A to 3B.

As explained above, such a configuration makes it possible to free up space behind the seat, for example to allow users to enter or exit the vehicle receiving the seat 1, by passing behind the seat 1, in particular when it is a vehicle without rear doors.

In such a configuration, the seat base frame 2 and the substructure 6 are moved relative to the anchoring means 3 in the longitudinal direction X and in the vertical direction Z of the seat 1, relative to the nominal configuration.

The connecting means 4 may thus be configured so that, relative to the nominal position:

- the front edge AV of the seat base frame 2 is moved forward in the longitudinal direction X of the seat 1, and brought closer to the anchoring means 3 in the vertical direction Z of the seat 1,
- the rear edge AR of the seat base frame 2 is moved forward in the longitudinal direction X of the seat 1, and moved away from the anchoring means 3 in the vertical direction Z of the seat 1.

Similarly, the substructure 6 may be configured so that its hinge to the backrest 5 on the third transverse axis Y3 is moved forward in the longitudinal direction X of the seat 1, and away from the anchoring means 3 in the vertical direction Z of the seat 1.

In such a configuration, the front connecting rod 41 may be configured so that it is inclined towards the front of the seat 1, i.e. its second longitudinal end E41' is located in front of its first longitudinal end E41 in the longitudinal direction X of the seat 1.

The first locking means 7 may advantageously be in its unlocked state while the second 8 and third 9 locking means may be in their locked state.

The transition from the nominal configuration to the easy entry configuration, or vice versa, is achieved by means of the activated electric motor M, which drives the rotation of the sector gear 42 and therefore of the front connecting rod 41 relative to the anchoring means 3 about the fourth transverse axis Y4 of the seat 1 at its first longitudinal end E41, the second 8 and third 9 locking means being in their unlocked state, while the first locking means 7 is in its locked state. Thus, due to the simultaneous action of the seat base frame 2 on the backrest 5 via their hinge along the first transverse axis Y1 and of the backrest 5 on the substructure 6 via their hinge along the third axis transverse Y3, the rotation of the front connecting rod 41 about the fourth transverse axis Y4 simultaneously causes movement of the seat base frame 2 relative to the anchoring means 3 and pivoting of the substructure 6 relative to the anchoring means 3 about the fourth transverse axis Y4, and in particular due to the high torque delivered by the irreversible electric motor M. The moment the electric motor M stops, the seat base frame 2 is locked in the desired configuration, the electric motor M being irreversible.

Figure 4A:
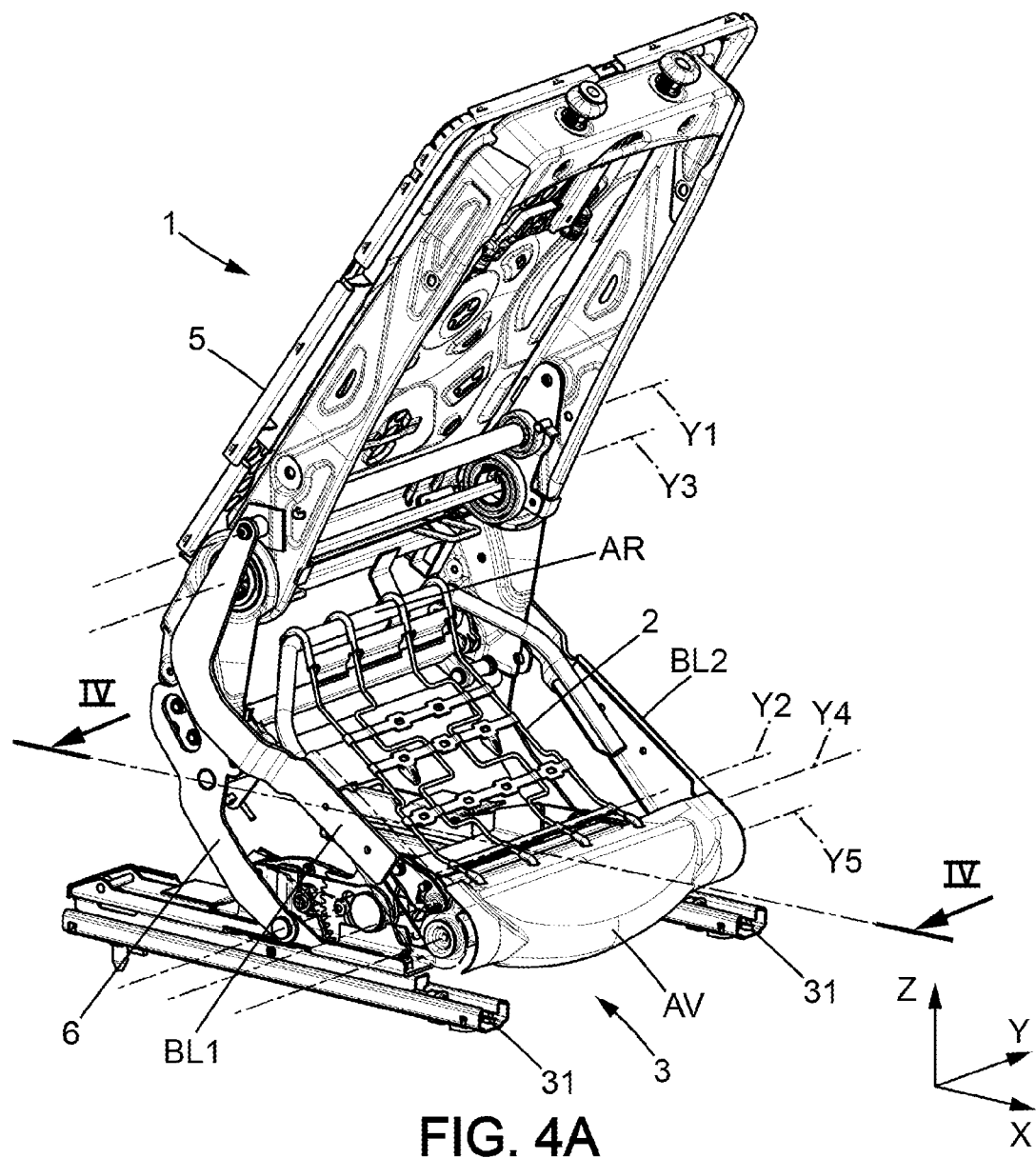
FIG. 4A shows a perspective view of a vehicle seat according to one embodiment of the present disclosure, in a fourth configuration referred to as panic exit I.
Figure 4B:
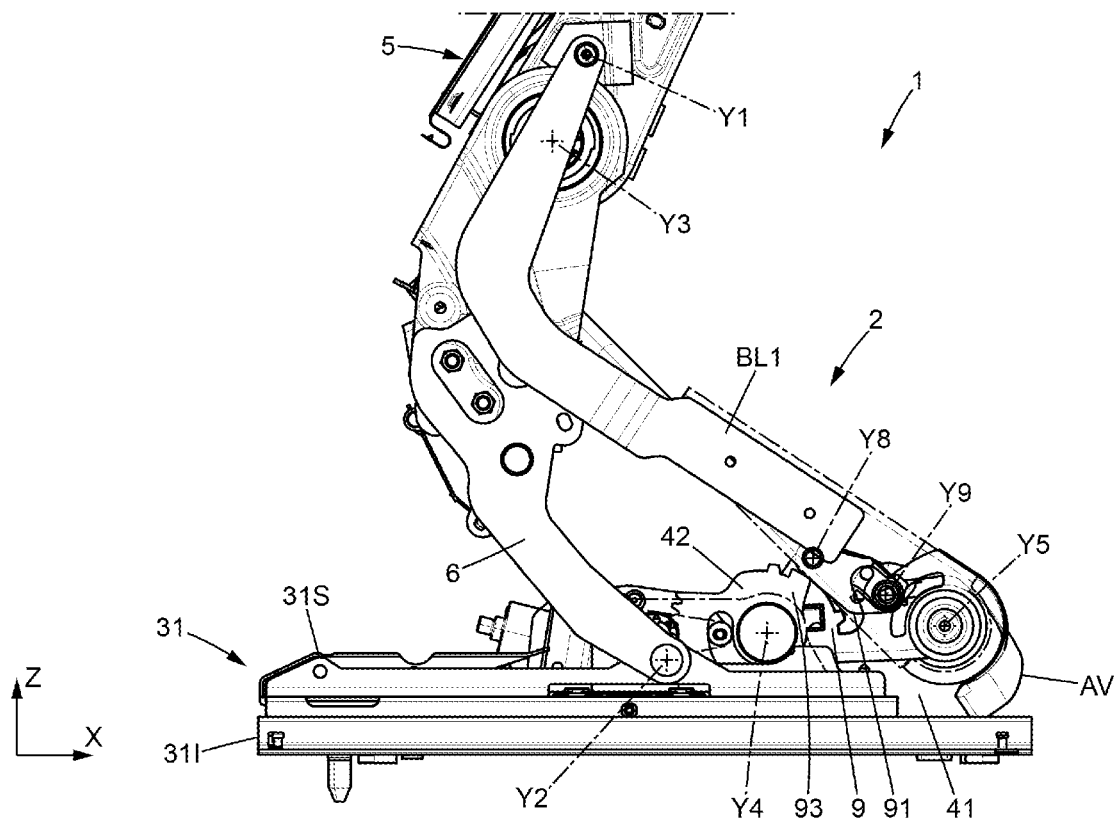
FIG. 4B shows a right view of the seat of FIG. 4A, in which certain elements have been made transparent.
Figure 4C:
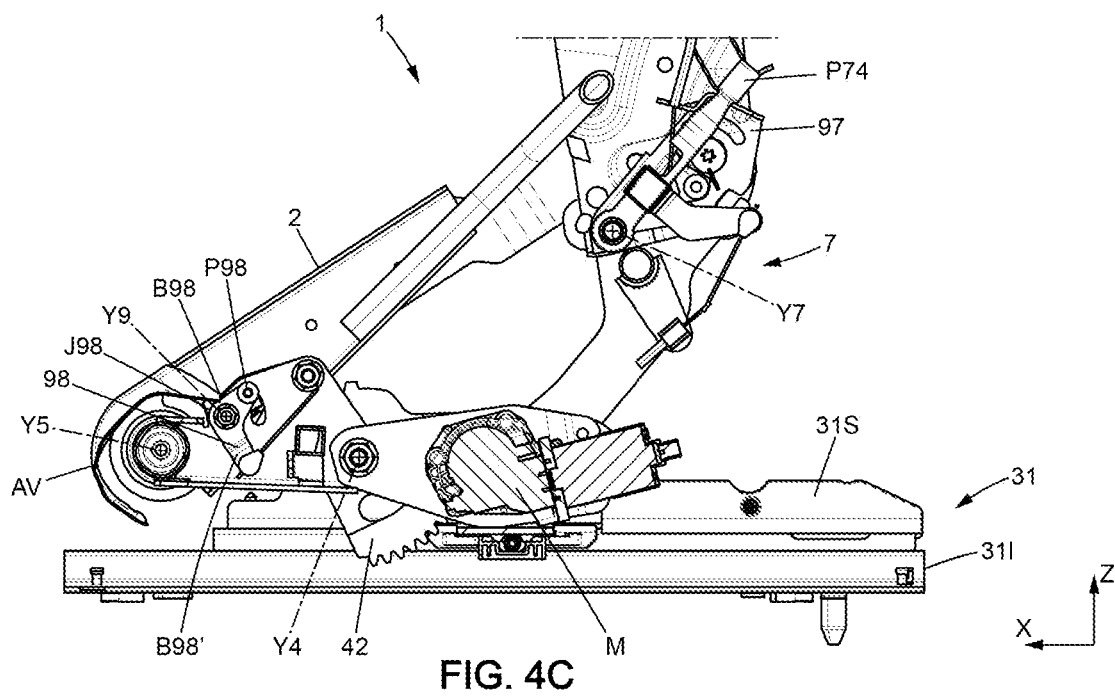
FIG. 4C shows a section view along line IV-IV of FIG. 4A of the seat of FIG. 4A.

The seat 1 may for example also assume a configuration called panic exit I, represented in the exemplary embodiments of FIGS. 4A to 4C.

Similarly to the easy entry configuration, such a configuration makes it possible to free up space behind the seat 1 in its longitudinal direction X, for example to allow users to quickly exit the vehicle receiving the seat 1 by passing behind the seat 1 in its longitudinal direction X, in particular when it is a vehicle without rear doors, and in particular in the event of a crash of the vehicle, and without operating the electric motor M.

The connecting means 4 may thus be configured so that, compared to the nominal configuration:

- the front edge AV of the seat base frame 2 is moved forward in the longitudinal direction X of the seat 1, and brought closer to the anchoring means 3 in the vertical direction Z of the seat 1,
- the rear edge AR of the seat base frame 2 is moved forward in the longitudinal direction X of the seat 1, and moved away from the anchoring means 3 in the vertical direction Z of the seat 1.

In such a configuration, the front connecting rod 41 may be configured so as to extend substantially in the longitudinal direction X of the seat 1, with its second longitudinal end E41' positioned in front of its first longitudinal end E41 in the vertical direction Z of the seat 1, as in the nominal configuration.

The second locking means 8 may advantageously be in its locked state while the first 7 and third 9 locking means may be in their unlocked state.

The transition from the nominal configuration to the panic exit I configuration, or vice versa, may advantageously be executed manually by a user, and in particular a user located behind the seat 1 in its longitudinal direction X, which, after the transition of the first 7 and third 9 locking means into their unlocked state, can exert a pushing force on the seat base frame 2, advantageously at its rear edge AR, and/or on the substructure 6 and/or on the backrest 5, upward in the vertical direction Z of the seat 1 and/or forward in the longitudinal direction X of the seat 1, and so as to cause rotation of the front connecting rod 41 relative to the anchoring means 3 about the fourth transverse axis Y4 of the seat 1 at the second longitudinal end E41' of the front connecting rod 41, and rotation of the substructure 6 relative to the anchoring means 3 about the second transverse axis Y2.

As the electric motor M is irreversible, and intended to be inactive in the nominal position, the sector gear 42 remains fixed relative to the anchoring means 3, the sector gear not being able to pivot about the fourth transverse axis Y4 of the seat 1.

Thus, by means of the seat 1 according to the present disclosure, a user, located in particular behind the seat 1 in its longitudinal direction X, may quickly and entirely manually cause the transition from the nominal configuration to the panic exit 1 configuration, which can enable the user to quickly evacuate the vehicle in the event of a crash.

In the panic exit I configuration, the second locking means 8 may also be brought to its unlocked state so as to allow rotation of the backrest 5 relative to the substructure 6 about the third transverse axis Y3 of the seat 1, which may also be caused manually by a pushing force exerted by a user, and in particular a user located behind the seat 1 in the longitudinal direction X of the seat 1, and in particular in order to fold the backrest 5 down against the seat base frame 2, for example in order to also free up the space above the seat base frame 2 in the vertical direction Z of the seat 1, for example to facilitate the passage of people or objects above the seat 1 in the vertical direction Z of the seat 1.

Figure 5A:
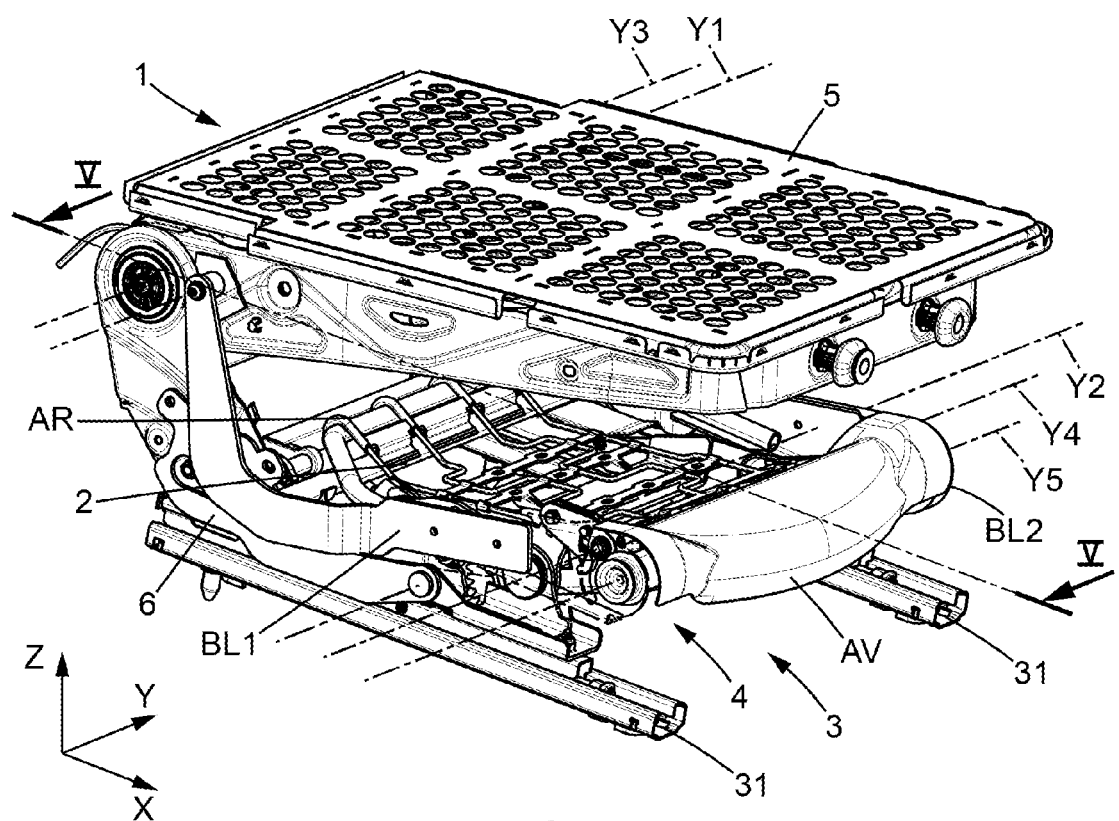
FIG. 5A shows a perspective view of a vehicle seat according to one embodiment of the present disclosure, in a fifth configuration referred to as panic exit II.
Figure 5B:
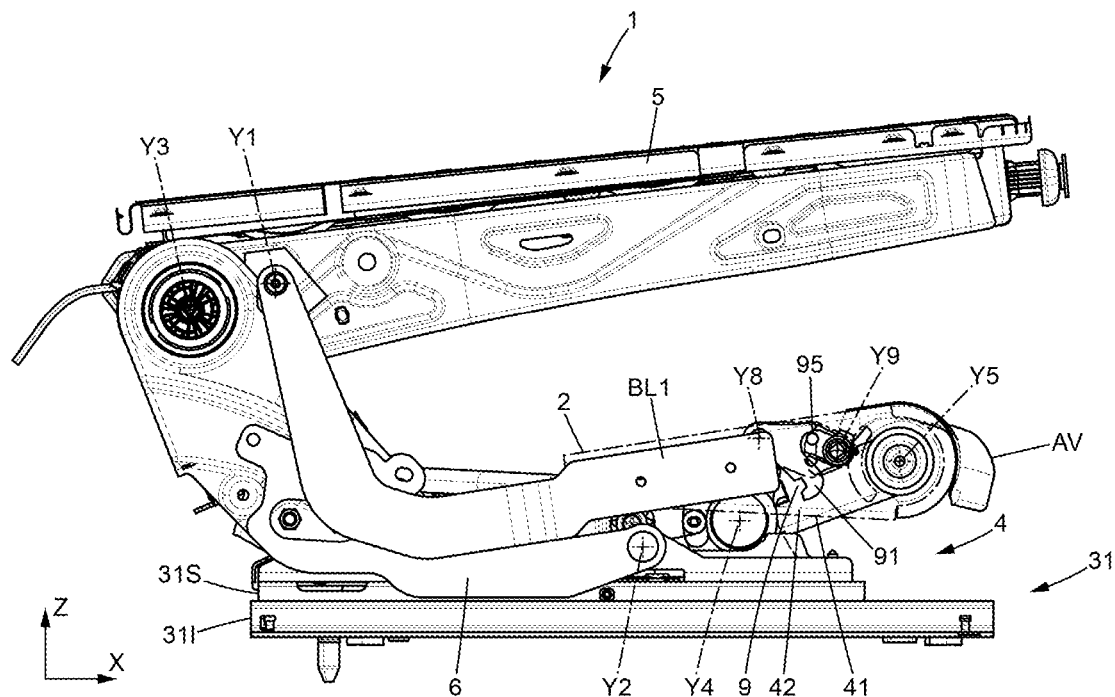
FIG. 5B shows a right view of the seat of FIG. 5A, in which certain elements have been made transparent.
Figure 5C:
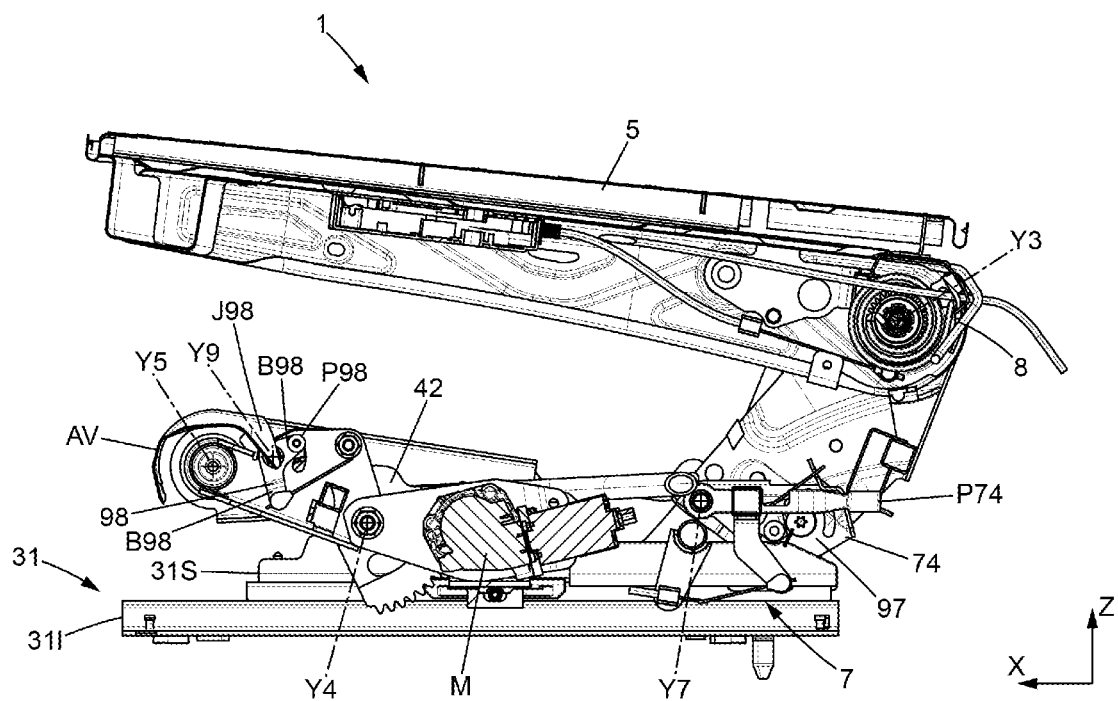
FIG. 5C shows a section view along line V-V of FIG. 5A of the seat of FIG. 5A.

The seat 1 may for example also take a configuration called panic exit II, represented in the embodiments of FIGS. 5A to 5C.

Like the flat floor configuration, such a configuration allows freeing up the passage above the seat 1 in its vertical direction Z, for example to allow users to quickly exit the vehicle receiving the seat 1 by passing above the seat 1 in its vertical direction Z, in particular when it is a vehicle without rear doors, and in particular in the event of a crash of the vehicle, and without operating the electric motor M.

The connecting means 4 may thus be configured so that, relative to the nominal configuration:

- the front edge AV of the seat base frame 2 is moved forward in the longitudinal direction X of the seat 1, and brought closer to the anchoring means 3 in the vertical direction Z of the seat 1,
- the rear edge AR of the seat base frame 2 is moved forward in the longitudinal direction X of the seat 1, and brought closer to the anchoring means 3 in the vertical direction Z of the seat 1.

In such a configuration, the front connecting rod 41 may be configured so as to extend substantially in the longitudinal direction X of the seat 1, with its second longitudinal end E41' positioned in front of its first longitudinal end E41 in the vertical direction Z of the seat 1, as in the nominal configuration.

The first locking means 7 can advantageously be in its locked state while the second 8 and the third 9 locking means can be in their unlocked state.

The transition from the nominal configuration to the panic exit II configuration, or vice versa, may advantageously be executed manually by a user, and in particular a user located behind the seat 1 in its longitudinal direction X, which, after the transition of the second 8 and the third 9 locking means into their unlocked state, can exert a forward pushing force on the backrest 5 in the longitudinal direction X of the seat 1, and cause it to rotate relative to the seat base frame 2 and to the substructure 6 respectively about the first transverse axis Y1 and the third transverse axis Y3 of the seat 1.

As the electric motor M is irreversible and intended to be inactivated in the nominal position, the sector gear 42 remains fixed relative to the anchoring means 3, the sector not being able to pivot about the fourth transverse axis Y4 of the seat 1.

Thus, by means of the seat 1 according to the present disclosure, a user located in particular behind the seat 1 in its longitudinal direction X, may quickly and entirely manually cause the transition from the nominal configuration to the panic exit II configuration, which can enable the user to quickly evacuate the vehicle in the event of a crash.

In the panic exit II configuration, the first locking means 7 may also be brought into its unlocked state so as to allow rotation of the substructure 6 relative to the anchoring means 3 about the second transverse axis Y2 of the seat 1, which may also be caused manually by a pushing force exerted by a user, and in particular a user located behind the seat 1 in the longitudinal direction X of the seat 1, and in particular in order to move away the rear edge AR of the seat base frame 2 and/or the hinge of the substructure 6 to the backrest 5 along the third transverse axis Y3 of the anchoring means 3, in the vertical direction Z of the seat 1, for example in order also to clear space behind the seat base frame 2 in the longitudinal direction X of the seat 1, for example to facilitate the passage of people or objects behind the seat 1 in the longitudinal direction X of the seat 1.

Advantageously, and as can be seen in FIGS. 1A to 5C, the anchoring means 3 may for example comprise two slide rails 31, arranged one on either side of the seat base frame 2 in the transverse direction Y of the seat 1, configured so as to allow translational movement of the seat 1 relative to the floor of the vehicle receiving the seat 1, in the longitudinal direction X of the seat 1.

The slide rails 31 may each have a lower profile 311 configured to be fixed to the floor of the vehicle, and slidably receiving, in the longitudinal direction X of the seat 1, an upper profile 31S.

Advantageously, the first longitudinal end E41 of the front connecting rod 41 and/or the substructure 6 may be hinged to the upper profile 31S of a slide rail 31 so as to pivot respectively about the fourth transverse axis Y4 and about the second transverse axis Y2 of the seat 1.

Figure 1B:
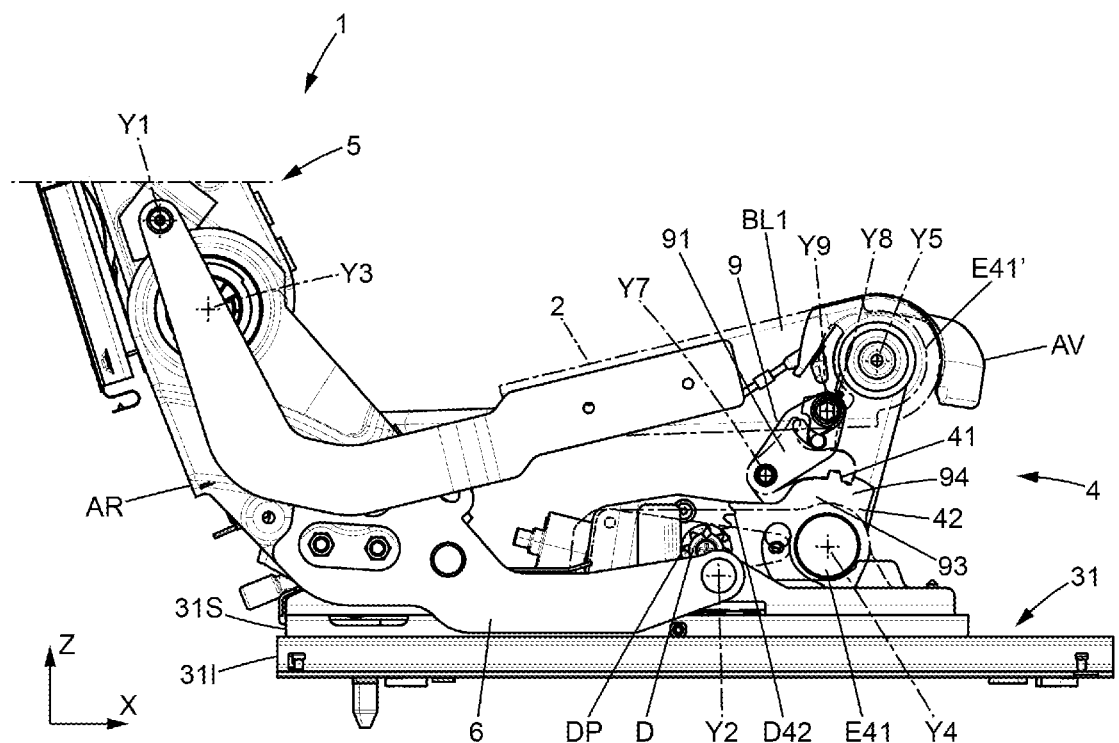
FIG. 1B shows a right view of the seat of FIG. 1A, in which certain elements have been made transparent.
Figure 1C:
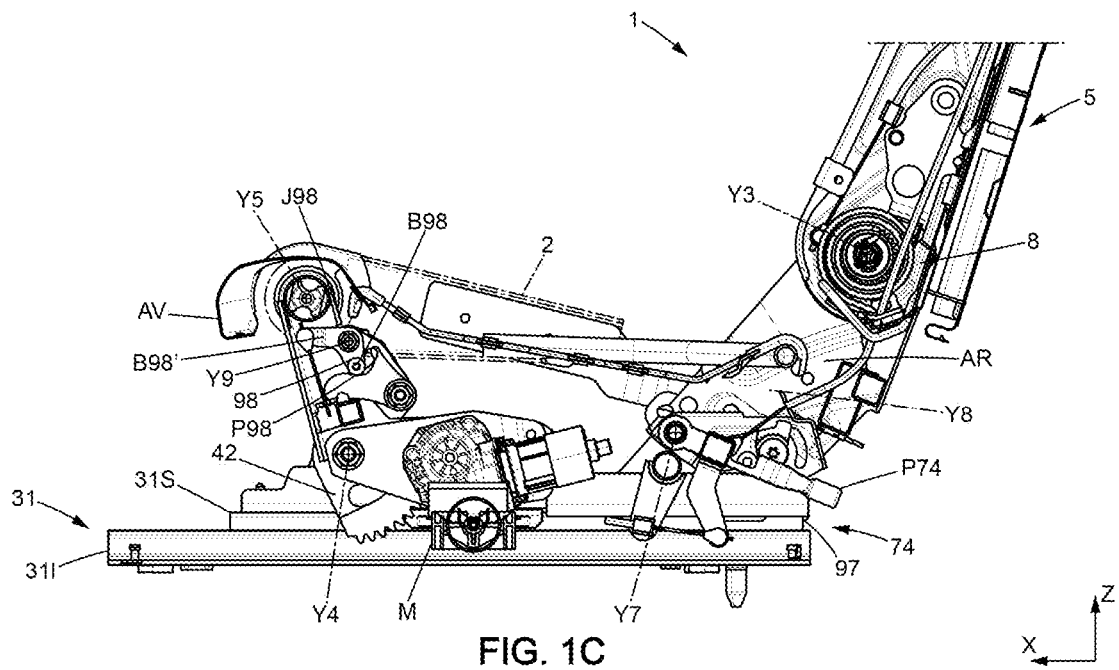
FIG. 1C shows a section view along line I-I of FIG. 1A of the seat of FIG. 1A.

Advantageously, the third transverse axis Y3 of the seat 1 may be positioned below the second transverse axis Y2 of the seat 1 in the vertical direction Z of the seat 1 when the backrest 5 extends substantially in the vertical direction Z of the seat 1, and as can be seen in the embodiments of FIGS. 1A to 1C.

This advantageously makes it possible to facilitate the driving of the pivoting of the backrest 5, relative to the substructure 6 about the third transverse axis Y3 of the seat 1, by the seat base frame 2 during its movement relative to the anchoring means 3, via the pivoting of the front connecting rod 41 relative to the anchoring means 3 about the fourth transverse axis Y4 of the seat 1, for example when the seat 1 transitions from its nominal configuration to its flat floor (or panic exit II) configuration and vice versa.

Figure 1D:
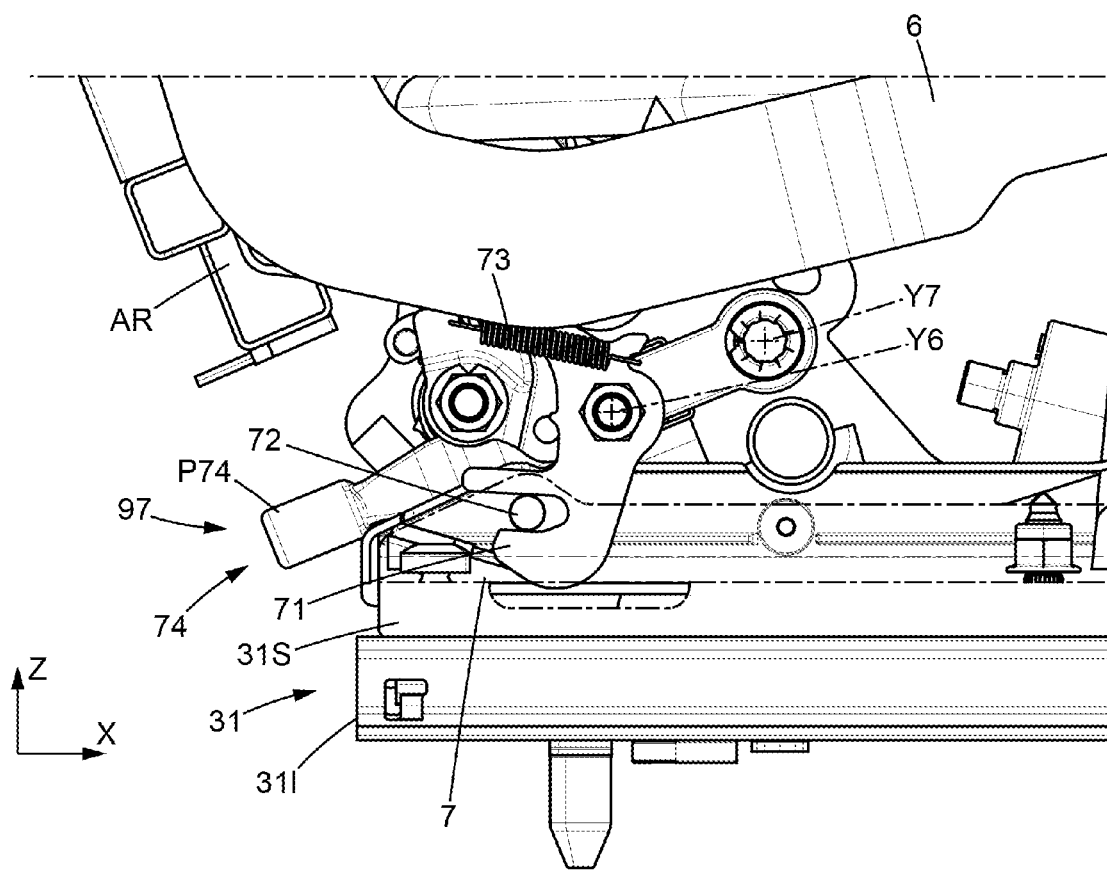
FIG. 1D shows a detail view of FIG. 1B from which certain elements of the seat have been removed.

Advantageously, and as can be seen more particularly in FIG. 1D, the first locking means 7 may comprise:

a hook 71 mounted on the anchoring means 3, and in particular on the upper profile 31S of a slide rail 31, so as to pivot about a sixth transverse axis Y6 of the seat 1, a pin 72 integral with the substructure 6 and extending in the transverse direction Y of the seat 1.

The hook 71 and the pin 72 may advantageously be configured so that the first locking means 7 transitions from its locked state to its unlocked state, and vice versa, by rotation of the hook 71 relative to the anchoring means 3 about the sixth transverse axis Y6 of the seat 1, with:

the hook 71 being engaged with the pin 72 in the locked state of the first locking means 7, and the hook 71 being separated from the pin 72 in the unlocked state of the first locking means 7.

Advantageously, the pin 72 of the first locking means 7 may be positioned on the substructure 6 near the rear edge AR of the seat base frame 2.

Advantageously, the first locking means 7 may further comprise a first elastic means m, for example such as a spring 73, configured to urge the first locking means 7 into its locked state, and in particular to urge the hook 71 into engagement with the pin 72.

According to one embodiment, the first locking means 7 comprises an actuator, and in particular an electric motor, configured to cause the automatic transition of the first locking means 7 from its locked state to its unlocked state, and vice versa.

The actuator may for example be intended to be activated or deactivated by being manually controlled by a user.

Additionally or alternatively, the actuator may be intended to be controlled automatically, for example via a control unit, and in particular a control unit of the vehicle receiving the seat 1 according to the present disclosure.

The actuator may in particular be configured so as to cause rotation of the hook 71 relative to the anchoring means 3 about the sixth transverse axis Y6, so as to cause the automatic transition of the first locking means 7 from its locked state to its unlocked state, and vice versa.

The actuator may in particular be connected to a rigid cable, for example such as a Bowden® cable, also connected to the hook 71, so as to cause it to pivot relative to the anchoring means 3 about the sixth transverse axis Y6 of the seat 1 under the action of the actuator.

According to one embodiment, and as can be seen more particularly in the exemplary embodiment of FIGS. 1C, 2C, 3C, 4C, and 5C, the first locking means 7 further comprises a first manual control means 74 configured to cause the transition of the first locking means 7 from its locked state to its unlocked state and vice versa by a manual action by a user on the first manual control means 74.

This advantageously allows a user to change the state of the first locking means 7 manually. For example, in an emergency, in particular in the event of an accident of the vehicle receiving the seat 1 according to the present disclosure, and if the seat 1 is in the nominal configuration, a user can manually transition the first locking means 7 into its unlocked state, so as to allow the seat 1 to transition from its nominal configuration to its panic exit I configuration, as described above.

In particular, the first manual control means 74 may be connected to the hook 71 so that a manual action by a user on the manual control means 74 causes the hook 71 to pivot relative to the anchoring means 3 about the sixth transverse axis Y6 of the seat 1.

According to one embodiment, the first manual control means 74 comprises a handle P74 mounted so as to pivot relative to the substructure 6 about a seventh transverse axis Y7 of the seat 1.

Advantageously, the handle P74 may be connected to the hook 71 via a rigid cable, and in particular a Bowden® cable, so as to cause it to pivot relative to the anchoring means 3 about the sixth transverse axis Y6 of the seat 1.

Advantageously, and in order to facilitate access to the handle P74 for a user located behind the seat 1 in its longitudinal direction X, the handle P74 may be positioned under the seat base frame 2 in the vertical direction Z of the seat 1, and close to the rear edge AR of the seat base frame 2.

According to one embodiment, the second locking means 8 comprises an actuator, and in particular an electric motor, configured to cause the automatic transition of the second locking means 8 from its locked state to its unlocked state, and vice versa.

The actuator may for example be intended to be activated or deactivated by being manually controlled by a user.

Additionally or alternatively, the actuator may be intended to be controlled automatically, for example via a control unit, and in particular a control unit of the vehicle receiving the seat 1 according to the present disclosure.

The second locking means 8 may also comprise a second elastic means, for example such as a spring, configured to urge the second locking means into its locked state.

Advantageously, according to one embodiment, the actuator of the first locking means 7 is the actuator of the second locking means 8.

This advantageous arrangement of the present disclosure makes it possible to simplify the manufacture of the seat 1 and to reduce its production cost, as a single actuator, and in particular a single electric motor, is used to control the first 7 and the second 8 locking means.

In addition, when the actuator is an electric motor, it may advantageously be configured so that:
  its rotation in a first direction of rotation causes the transition of the first locking means 7 into its locked state and the transition of the second locking means 8 into its unlocked state,
  its rotation in a second direction of rotation, opposite to the first direction of rotation, causes the transition of the first locking means 7 into its unlocked state and the transition of the second locking means 8 into its locked state.

Thus, the first locking means 7 and the second locking means 8 are never in the same state when actuated by the electric motor, so as to facilitate the transition of the seat 1 from its nominal configuration to its easy entry configuration and vice versa, with no risk of the backrest 5 pivoting relative to the substructure about the third transverse axis Y3 of the seat 1, as well as the transition of the seat 1 from its nominal configuration to its flat floor configuration and vice versa, with no risk of the substructure 6 pivoting relative to the anchoring means 3 about the second transverse axis Y2 of the seat 1.

Indeed, and as explained above, to effect the transition of the seat 1 from its nominal configuration to its easy entry configuration or vice versa, the first locking means 7 is in its unlocked state while the second locking means 8 is in its locked state, while to effect the transition of the seat 1 from its nominal configuration to its flat floor configuration or vice versa, the first locking means 7 is in its locked state while the second locking means 8 is in its unlocked state.

According to one embodiment, the second locking means 8 further comprises a second manual control means configured to cause the transition of the second locking means 8 from its locked state to its unlocked state and vice versa by a manual action by a user on the second manual control means.

This advantageously allows a user to change the state of the second locking means 8 manually. For example, in an emergency, in particular in the event of an accident of the vehicle receiving the seat 1 according to the present disclosure, and if the seat 1 is in the nominal configuration, a user can manually transition the second locking means 8 into its unlocked state, so as to allow the seat 1 to transition from its nominal configuration to its panic exit II configuration, as described above.

According to one embodiment, and as can be seen more particularly in FIGS. 1B, 1E, 2B, 3B, 4B and 5B, the third locking means 9 comprises:
  a first locking part 91 integral with the front connecting rod 41 and hinged around an eighth transverse axis Y8 of the seat 1 to the front connecting rod 41, and having a first interlocking part 92,
  a second locking part 93 integral with the sector gear 42 and fixed relative to the sector gear 42, and having a second interlocking part 94 configured to fit into the first interlocking part 92 of the first locking part 91, so as to prevent rotation of the front connecting rod 41 relative to the sector gear 42 about the fourth transverse axis Y4 of the seat 1.

Advantageously:
  the locked state of the third locking means 9 can correspond to at least one locking position of the second locking part 93 relative to the first locking part 91 in which the first interlocking part 92 of the first locking part 91 is fitted into the second interlocking part 94 of the second locking part 93 so as to prevent rotation of the front connecting rod 41 relative to the sector gear 42 about the fourth transverse axis Y4 of the seat 1,
  the unlocked state of the third locking means 9 can correspond to at least one unlocking position of the second locking part 93 relative to the first locking part 91 in which the first interlocking part 92 of the first locking part 91 is separated from the second interlocking part 94 of the second locking part 93 so as to allow rotation of the front connecting rod 41 relative to the sector gear 42 about the fourth transverse axis Y4 of the seat 1.

This design of the third locking means 9 is simple and of reduced size and production cost.

The first locking part 91 may in particular have substantially the shape of a hook.

According to one embodiment, the second locking part 93 is made as one piece with and of the same material as the sector gear 42.

This advantageously makes it possible to facilitate the manufacture of the third locking means 9 and therefore to reduce the production cost of the seat 1 according to the present disclosure.

Alternatively, and without departing from the scope of the present disclosure, the second locking part 93 may be designed as a removable part fixed to the sector gear 42.

Figure 1E:
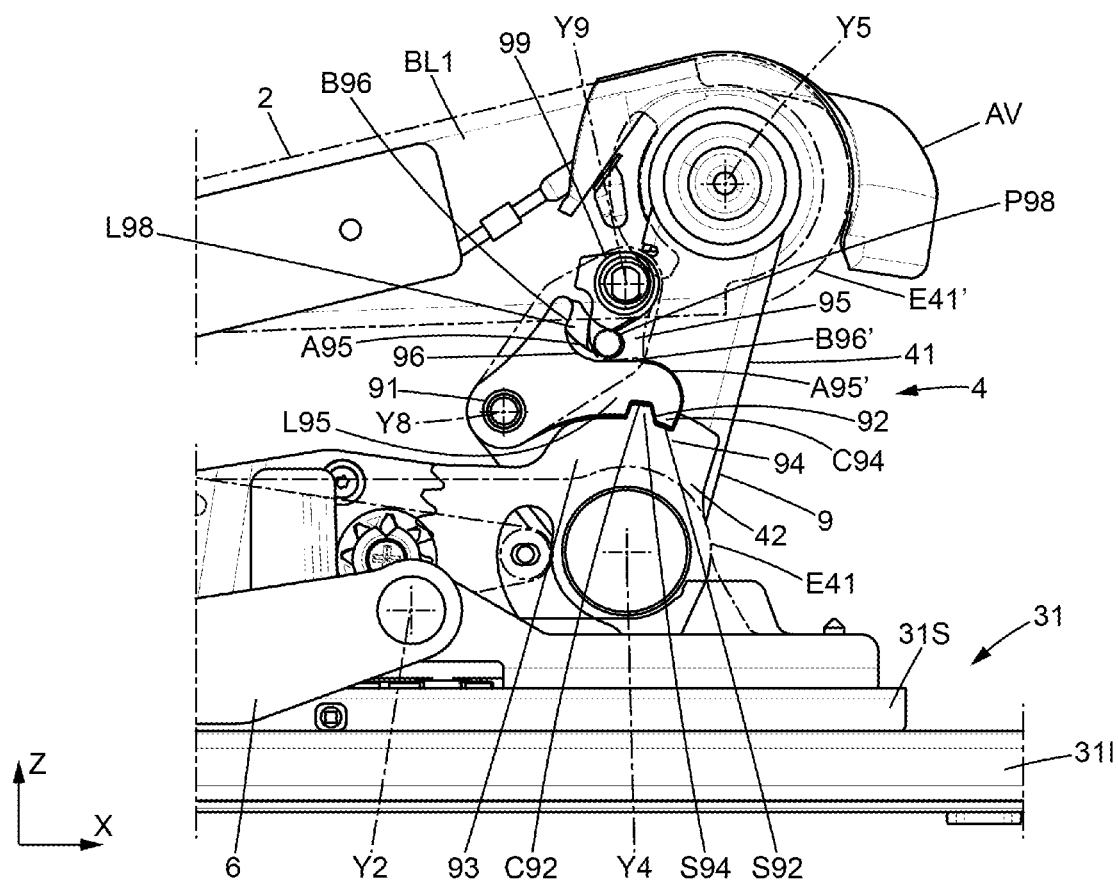
FIG. 1E shows a detail view of FIG. 1B from which certain elements of the seat have been removed.

According to one embodiment, and as can be seen more particularly in FIG. 1E:
- the first interlocking part 92 comprises a first recess C92 and/or a first projection S92, in particular adjacent to the first recess C92,
- the second interlocking part 94 comprises a second projection S94, configured to fit together with the first recess C92 of the first interlocking part 92 with possible interlocking clearance and/or a second recess C94, in particular adjacent to the second projection S94, configured to fit together with the first projection S92 of the first interlocking part 92 with possible interlocking clearance.

Such a design of the first 92 and the second 94 interlocking part makes it possible to obtain a firm and resistant retention of the first locking part 91 with the second locking part 93, with a simple design and reduced production price of the third locking means 9.

Advantageously, the first recess C92 and/or the second recess C94 and/or the first projection S92 and/or the second projection S94 may have a substantially trapezoidal shape.

According to one embodiment, and as can be seen more particularly in FIGS. 1B, 1E, 2B, 3B, 4B, and 5B, the third locking means 9 further comprises:
- a pivoting cam 95 hinged to the front connecting rod 41 so as to pivot about a ninth transverse axis Y9 of the seat 1, and
- a cam track 96 integral with and fixed relative to the first locking part 91, and in particular made as one piece with and of the same material as the first locking part 91.

Advantageously, the cam 95 and the cam track 96 may be configured to cooperate in order to drive the pivoting of the first locking part 91 relative to the front connecting rod 41 about the eighth transverse axis Y8 of the seat 1 between the at least one locking position of the first locking part 91 relative to the second locking part 93 and the at least one unlocking position of the first locking part 91 relative to the second locking part 93.

Advantageously, and as can be seen more particularly in FIG. 1E:
- the cam 95 may have a first bearing surface A95 and a second bearing surface A95', and
- the cam track 96 has a first abutment surface B96 and a second abutment surface B96'.

In addition:
- the rotation of the first locking part 91 relative to the front connecting rod 41 about the eighth transverse axis Y8 may be driven in a first direction of rotation, advantageously corresponding to the transition from the at least one locking position to the at least one unlocking position of the first locking part 91 relative to the second locking part 93, by a pressing of the first bearing surface A95 of the cam 95 against the first abutment surface B96 of the cam track 96, and
- the rotation of the first locking part 91 relative to the front connecting rod 41 about the eighth transverse axis Y8 may be driven in a second direction of rotation, opposite to the first direction of rotation, advantageously corresponding to the transition from the at least one unlocking position to the at least one locking position of the first locking part 91 relative to the second locking part 93, by a pressing of the second bearing surface A95' of the cam 95 against the second abutment surface B96' of the cam track 96.

The cam 95 may for example comprise at least one arm L95 of substantially rectangular shape hinged to the front connecting rod 41 along the ninth transverse axis Y9 near a first longitudinal end of the arm L95.

The first bearing surface A95 and the second bearing surface A95' of the cam 95 may be provided near a second longitudinal end of the arm distanced from the ninth transverse axis Y9. In particular, the first bearing surface A95 and the second bearing surface A95' of the cam 95 may be provided on two adjacent faces of the arm L95, in particular substantially perpendicular to each other.

According to one embodiment, the third locking means 9 further comprises a third manual control means 97 configured to cause the transition of the third locking means 9 from its locked state to its unlocked state and vice versa by a manual action by a user on the third manual control means 97.

This advantageously allows a user to change the state of the third locking means 9 manually. For example, in an emergency, in particular in the event of an accident of the vehicle receiving the seat 1 according to the present disclosure, and if the seat 1 is in the nominal configuration, a user can manually transition the third locking means 9 into its unlocked state, so as to allow the seat 1 to transition from its nominal configuration to its panic exit I configuration, as described above.

In particular, the third manual control means 97 may be connected to the cam 95, for example via a rigid cable, and in particular a Bowden® cable, so that a manual action by a user on the third manual control means 97 causes the cam 95 to pivot relative to the front connecting rod 41 about the ninth transverse axis Y9 of the seat 1.

According to one embodiment, the third manual control means 97 of the third locking means 9 comprises the handle P74 of the first manual control means 74 of the first locking means 7.

Advantageously, the handle P74 may be connected to the cam 95 via a rigid cable, and in particular a Bowden® cable, separate from the rigid cable that may connect the handle P74 to the hook 71 of the first locking means 7 so as to drive the pivoting of the cam relative to the front connecting rod 41 about the ninth transverse axis Y9 of the seat 1.

This advantageously allows a user to manually change the state of the first locking means 7 and the third locking means 9 simultaneously, by a single action on the handle P74. For example, in the event of an emergency, in particular in the event of an accident of the vehicle receiving the seat 1 according to the present disclosure, and if the seat 1 is in the nominal configuration, a user can manually transition the first locking means 7 and the third locking means 9 simultaneously into their respective unlocked state, so as to allow the seat 1 to transition quickly from its nominal configuration to its panic exit I configuration, as described above, which is particularly advantageous in an emergency.

According to one embodiment, and as can be seen more particularly in FIGS. 1C, 2C, 3C, 4C, and 5C, the third locking means 9 comprises an actuating part 98 integral with and fixed relative to the cam 95, and mounted on the front connecting rod 41 so as to pivot about the ninth transverse axis Y9 of the seat 1, the actuating part 98 being connected to the manual control means 97, for example by means of a rigid cable, and in particular a Bowden® cable, such that a manual action by a user on the third manual control means 97 causes the actuating part 98 to pivot relative to the front connecting rod 41 about the ninth transverse axis Y9 of the seat 1, and therefore the cam 95 to pivot relative to the front connecting rod 41 about the ninth transverse axis Y9 of the seat 1.

Thus, the cam 95 is not directly connected to the manual control means 97, which could prove to be complicated to implement considering the design of the third locking means 9 with in particular the need for mobility of the cam 95, first locking part 91, front connecting rod 41, and sector gear 42, and the reduced available space between the seat base frame 2 and the anchoring means 3 in the vertical direction Z of the seat 1.

Advantageously, and as can be seen in FIGS. 1B, 1C, 1E, 2B, 2C, 3B, 3C, 4B, 4C, 5B, 5C, the cam 95 and the actuating part 98 may be arranged one on either side of the front connecting rod 41 in the transverse direction Y of the seat 1, and in particular with the actuating part 98 positioned between the first side edge BL1 and the second side edge BL2 of the seat base frame 2 in the transverse direction Y of the seat 1.

Indeed, to ensure the operation of the third locking means 9 according to the design described above, it is advantageous that the sector gear 42, the front connecting rod 41, the first locking part 91, the second locking part 93, the cam 95, and the cam track 96 are positioned on the same side of the front connecting rod 41 in the transverse direction Y of the seat 1, and in particular on the side of the front connecting rod 41 external to the space between the first side edge BL1 and the second side edge BL2 in the transverse direction Y of the seat 1, and between the seat base frame 2 and the anchoring means 3 in the vertical direction Z of the seat 1. However, as explained above, the space is reduced between the seat base frame 2 and the anchoring means 3 in the vertical direction Z of the seat 1, as well as on the side of the front connecting rod 41 external to the space between the first side edge BL1 and the second side edge BL2 in the transverse direction Y of the seat 1. Thus, it proves advantageous to position the actuating part 98 on the other side of the front connecting rod 41 in the transverse direction Y of the seat 1 relative to the cam 95, and in particular on the side inside the space between the first side edge BL1 and the second side edge BL2 in the transverse direction Y of the seat 1, which has space available.

The cam 95 and the actuating part 98 may advantageously be interconnected by a pin P98 extending substantially in the transverse direction Y of the seat 1, and advantageously through a slot L98 formed in the front connecting rod 41. The pin P98 may advantageously be distanced from the ninth transverse axis Y9 of the seat 1 at a sufficient distance for the lever arm between the ninth transverse axis Y9 and the pin P98 to allow the cam 95 to be driven to rotate relative to the front connecting rod 41 about the ninth transverse axis Y9 by the rotation of the actuating part 98 relative to the front connecting rod 41 about the ninth transverse axis Y9, as explained above.

According to one embodiment, the actuating part 98 has a first arm B98 and a second arm B98' interconnected at a joining area J98 near one of their respective longitudinal ends, for example so as to have a substantially L or V shape, with the first arm B98 fixed to the cam 95 and the second arm B98' connected to the third manual control means 97, and in particular by means of the rigid cable, the actuating part 98 being hinged to the front connecting rod 41 so as to pivot about the ninth transverse axis Y9 of the seat 1 at the joining area J98 between the first arm B98 and the second arm B98' of the actuating part 98.

The actuating part 98 thus has, at each of the arms B98, B98', a lever arm that is sufficient relative to the ninth transverse axis Y9 to cause both its rotation relative to the front connecting rod 41 about the ninth transverse axis Y9 as well as the rotation of the cam 95 relative to the front connecting rod 41 about the ninth transverse axis Y9.

According to one embodiment, and as can be seen more particularly in FIG. 1E, the third locking means 9 further comprises a third elastic means 99, such as a spring 99, configured to urge the third locking means 9 into its locked state.

In particular, the third elastic means 99 may be configured so as to urge the first locking part 93 into its at least one locking position relative to the front connecting rod 41 about the eighth transverse axis Y8.

The third elastic means 99 may further be configured so as to urge the cam 95 into at least one position relative to the front connecting rod 41 about the ninth transverse axis Y9 which drives the first locking part 93 into its at least one locking position relative to the front connecting rod 41 about the eighth transverse axis Y8, and in particular with its second bearing surface A95' pressing against the second abutment surface B96' of the cam track 96.

Lastly, the third elastic means 99 may be configured so as to also urge the actuating part 98 into at least one position relative to the front connecting rod 41 about the ninth transverse axis Y9 which drives the cam 95 into at least one position relative to the front connecting rod 41 about the ninth transverse axis Y9 which drives the first locking part 93 into its at least one locking position relative to the front connecting rod 41 about the eighth transverse axis Y8, as described above.

The third elastic means 99 may for example consist of a torsion spring configured to exert a torsional force on the cam 95 and/or on the actuating part 98 along the ninth transverse axis Y9 of the seat 1, and so as to force the third locking means 9 into its locked state, as detailed above.

The torsion spring 99 may thus be connected to the pin P98 connecting the actuating 98 and the cam 95, as described above, and so as to exert a torsional force on the actuating part 98 and the cam 95 simultaneously, and with a lever arm sufficient to urge the cam 95 and actuating part 98 simultaneously into their at least one respective position relative to the front connecting rod 41 about the ninth transverse axis Y9 which drives the first locking part 93 into its at least one locking position relative to the front connecting rod 41 about the eighth transverse axis Y8, as described above.

The present disclosure also relates to a vehicle comprising a seat according to the present disclosure.

The vehicle may in particular be a motor vehicle.

All of the provisions described above concerning a vehicle receiving the seat 1 according to the present disclosure apply to the vehicle according to the present disclosure.

Of course, other embodiments are conceivable to those skilled in the art without departing from the scope of the present disclosure defined by the claims below.

A vehicle generally comprises at least one seat intended to accommodate a driver or a passenger of the vehicle, hereinafter referred to as the user. The term user may also designate another occupant of the vehicle receiving the seat, and in particular an occupant located close to the seat. The seat may be intended to accommodate one person or several people seated side by side, and may be arranged at the front or at the rear of the vehicle.

Thus, within the meaning of the present disclosure, the term seat according to the present disclosure designates a front seat of the vehicle as well as a rear seat of the vehicle. In the same vein, the present disclosure can be implemented for seats intended for any type of vehicle and in particular for motor vehicles.

A vehicle seat generally comprises a seat base frame, configured to be connected to the floor of a vehicle, in particular by anchoring means for anchoring to the floor of the vehicle, generally comprising two slide rails, arranged one on either side of the seat base frame in the transverse direction of the seat and configured to be fixed to the floor of the vehicle while allowing the seat to slide relative to the floor of the vehicle in the longitudinal direction of the seat.

The seat base frame has a front edge and a rear edge interconnected by a first side edge and a second side edge, the seat base frame being configured to accommodate at least one user.

The seat base frame may be connected to the anchoring means by connecting means enabling movement of the seat base frame relative to the anchoring means at least in the longitudinal direction and vertical direction of the seat, and therefore relative to the floor of the vehicle, so as to be able to adopt different positions relative to the floor of the vehicle, making it possible to offer different configurations of use for the seat.

The seat may also comprise at least one backrest, hinged to the seat base frame at its rear edge so as to pivot about a first transverse axis of the seat, as well as a substructure hinged to the anchoring means along a second transverse axis of the seat and to the backrest along a third transverse axis of the seat, such that the movement of the seat base frame relative to the anchoring means in the longitudinal direction and vertical direction of the seat, and therefore relative to the floor of the vehicle, causes the simultaneous pivoting of the backrest relative to the seat base frame about the first transverse axis, again in order to offer different configurations of use for the seat.

The connecting means for connecting the seat base frame to the anchoring means may in particular comprise a front connecting rod, having a first longitudinal end and a second longitudinal end, hinged near its first longitudinal end to the anchoring means for anchoring to the floor of the vehicle, along a fourth transverse axis of the seat, and near its second longitudinal end to the seat base frame along a fifth transverse axis of the seat.

The different configurations for the seat correspond in particular to the various possible positions of the backrest relative to the seat base frame, combined with the various possible positions of the seat base frame relative to the anchoring means.

For example, when a user is seated on the seat of the vehicle, in particular during a ride in the vehicle, the seat may be designed to be in what is called a nominal configuration, in which the seat base frame is substantially parallel to the floor of the vehicle, while the backrest extends substantially in the vertical direction of the vehicle, corresponding substantially to the vertical direction of the seat when it is fixed to the floor of the vehicle, and substantially perpendicular to the floor of the vehicle.

In order to free up space behind the seat, for example to allow users to enter or leave the vehicle receiving the seat by passing behind the seat, in particular for the case of a vehicle without rear doors, what is called an easy entry configuration may be provided, in which the rear edge of the seat base frame and the substructure are moved upward in the vertical direction of the seat, and forward in the longitudinal direction of the seat, relative to their position in the nominal configuration. In such a configuration, the front edge of the seat base frame may be arranged to move forward in the longitudinal direction of the seat, while drawing closer to the anchoring means in the vertical direction of the seat, via the pivoting of the front connecting rod about the fourth and fifth transverse axes of the seat, as described above. Similarly, the hinge of the substructure to the backrest along the third transverse axis of the seat may also be moved upward in the vertical direction of the seat, and forward in the longitudinal direction of the seat, via the pivoting of the substructure relative to the anchoring means about the second transverse axis as described above.

Also, in this easy entry configuration, the backrest can also be folded down towards the seat base frame by pivoting relative to the seat base frame and to the substructure, respectively about the first transverse axis and the third transverse axis, so as to maximize the space behind the seat.

To facilitate the movement of the seat base frame relative to the anchoring means for the transition of the seat from its nominal configuration to its easy entry configuration, and vice versa, an actuator may be used, and in particular an electric motor, to drive the rotation of the front connecting rod relative to the anchoring means about the fourth transverse axis of the seat.

What is called a flat floor configuration may also be provided, in which the backrest is folded down against the seat base frame, extending substantially parallel thereto, and also in which the seat base frame is moved forward in the longitudinal direction of the seat and downward in the vertical direction of the seat relative to its position in the nominal configuration. Such a flat floor configuration advantageously makes it possible to reduce the dimensions of the seat in its vertical direction, and for example in order to make it possible to place one or more loads on the folded backrest, in particular when the seat is located at the rear of a vehicle, immediately in front, in the longitudinal direction of the vehicle, of a rear loading compartment of the vehicle.

To facilitate the movement of the seat base frame relative to the anchoring means to allow the seat to transition from its nominal configuration to its flat floor configuration, and vice versa, an actuator may be used, and in particular an electric motor, to drive the rotation of the front connecting rod relative to the anchoring means about the fourth transverse axis of the seat.

The same single actuator, and in particular the same single electric motor, may be provided to drive the pivoting of the front connecting rod relative to the anchoring means about the fourth transverse axis in order to allow the seat to transition from its nominal configuration to its easy entry configuration and vice versa, and to transition from its nominal configuration to its flat floor configuration and vice versa.

This makes it possible to use a single actuator, and in particular a single electric motor, to cause the seat base frame to move relative to the anchoring means and the backrest to move relative to the seat base frame, and therefore to cause the seat to transition from its nominal configuration to its easy entry configuration and vice versa, but also from its nominal configuration to its flat floor configuration and vice versa.

To allow such an operation of the seat, there may be provided in particular a first locking means, capable of transitioning from a locked state in which the first locking means prevents rotation of the substructure relative to the anchoring means about the second transverse axis of the seat, to an unlocked state in which the first locking means allows rotation of the substructure relative to the anchoring means about the second transverse axis of the seat, and vice versa.

There may also be provided a second locking means, capable of transitioning from a locked state in which the second locking means prevents rotation of the backrest relative to the substructure about the third transverse axis, to an unlocked state in which the second locking means allows rotation of the backrest relative to the substructure about the third transverse axis.

The first locking means and/or the second locking means may advantageously be arranged to be controlled electronically to transition from their locking state to their unlocking state and vice versa.

Thus, during the transition of the seat from its nominal configuration to its easy entry configuration and vice versa, the first locking means may be in its unlocked state, while the second locking means is in its locked state. Similarly, during the transition of the seat from its nominal configuration to its flat floor configuration and vice versa, the first locking means may be in its locked state, while the second locking means is in its unlocked state.

It may also be desirable to be able to move the seat base frame and the substructure relative to the anchoring means for anchoring to the vehicle floor, by moving the rear edge of the seat base frame and the substructure away from the anchoring means for anchoring to the floor of the vehicle, in the vertical direction of the seat, in order to give the seat a configuration referred to as panic exit I, so as to free up space behind the seat in the longitudinal direction of the seat, manually, i.e. without the aid of the actuator and in particular of the electric motor, causing the rotation of the connecting rod connected to the front edge of the seat base frame, relative to the anchoring means, about the fourth transverse axis of the seat, in particular in the event of a crash of the vehicle causing a rapid exit by its occupants, and in particular those located behind the seat in the longitudinal direction of the seat, or if the actuator has been deactivated or damaged.

It may also be desirable to be able to pivot the backrest relative to the seat base frame and to the substructure, about the first transverse axis and about the third transverse axis of the seat, and in particular in order to move it closer to the seat base frame, as in its flat floor configuration, in order to give the seat a configuration referred to as panic exit II, so as to free up space above the seat in the vertical direction of the seat, manually, i.e. without the aid of the actuator and in particular of the electric motor, in particular in the event of a crash of the vehicle causing a rapid exit by its occupants, and in particular those located behind the seat in the longitudinal direction of the seat, or if the actuator has been deactivated or damaged, or if the first connecting rod and/or the first locking means are damaged.

To this end, the comparative actuator is a reversible electric motor, i.e. configured to allow rotation of its rotor, respectively of its stator, relative to its stator, respectively its rotor, when it is not activated, in order to allow manual movement of the seat base frame relative to the anchoring means for anchoring to the floor of the vehicle, or even manual pivoting of the backrest relative to the seat base frame about the first transverse axis of the seat.

This design has disadvantages, however.

In particular, comparative reversible electric motors generally deliver a reduced motor torque compared to irreversible electric motors, generally by a factor of 2. For example, comparative reversible electric motors used for vehicle seats generally provide a motor torque of around 25 Nm, while an irreversible motor of substantially equivalent size and power can generally provide a motor torque at least equal to 50 Nm. The use of a comparative reversible electric motor can thus complicate the design of the seat according to the present disclosure, as its elements should, for example, be lightened to allow movement of the seat base frame and substructure relative to the anchoring means for anchoring to the floor of the vehicle, and pivoting of the backrest relative to the seat base frame and to the substructure respectively about the first transverse axis and the third transverse axis of the seat, and in particular by means of a front connecting rod and a first locking means and a second locking means as described above, the lever arm between the two ends of such a front connecting rod generally being smaller.

The present disclosure overcomes the shortcomings of comparative vehicle seats by proposing a vehicle seat capable of transitioning automatically via a single actuator, and in particular an electric motor, between different configurations, and in particular the nominal, easy entry, and flat floor configurations, as described above, and in which the movement of the seat base frame and substructure relative to the floor of the vehicle or the pivoting of the backrest relative to the seat base frame and substructure can be carried out manually by a user, of simplified design and reduced production cost.

A vehicle seat is proposed comprising:
- a seat base frame having a front edge and a rear edge interconnected by a first side edge and a second side edge,
- anchoring means for anchoring the seat to the floor of a vehicle,
- connecting means for connecting the seat base frame to the anchoring means, enabling movement of the seat base frame relative to the anchoring means at least in the longitudinal direction and in the vertical direction of the seat,
- a backrest hinged to the seat base frame near its rear edge so as to pivot about a first transverse axis of the seat,
- a substructure hinged to the anchoring means so as to pivot about a second transverse axis of the seat and hinged to the backrest so as to pivot about a third transverse axis of the seat.

According to the present disclosure, the connecting means comprise:
- a front connecting rod having a first longitudinal end and a second longitudinal end, the front connecting rod being hinged to the anchoring means near its first longitudinal end so as to pivot about a fourth transverse axis of the seat and hinged to the seat base frame near its second longitudinal end so as to pivot about a fifth transverse axis of the seat, near its front edge,
- a sector gear hinged to the anchoring means so as to pivot about the fourth transverse axis of the seat.

According to the present disclosure, the seat further comprises an irreversible electric motor configured for:
- causing rotation of the sector gear relative to the anchoring means about the fourth transverse axis, when activated, and
- preventing rotation of the sector gear relative to the anchoring means about the fourth transverse axis, when inactivated.

According to the present disclosure, the seat further comprises:
- a first locking means able to transition:
  - from a locked state, in which the first locking means prevents rotation of the substructure relative to the anchoring means of the seat about the second transverse axis, to
  - an unlocked state, in which the first locking means allows rotation of the substructure relative to the anchoring means of the seat about the second transverse axis, and vice versa,
- a second locking means able to transition:
  - from a locked state, in which the second locking means prevents rotation of the backrest relative to the substructure about the third transverse axis, to
  - an unlocked state, in which the second locking means allows rotation of the backrest relative to the substructure (6) about the third transverse axis, and vice versa,
- a third locking means able to transition:
  - from a locked state, in which the third locking means prevents rotation of the front connecting rod relative to the sector gear about the fourth transverse axis by fixedly connecting the front connecting rod to the sector gear, to
  - an unlocked state, in which the third locking means allows rotation of the front connecting rod relative to the sector gear about the fourth transverse axis, and vice versa.

According to optional features of the present disclosure, taken alone or in combination:
- the first locking means comprises an actuator, and in particular an electric motor, configured to cause the automatic transition of the first locking means from its locked state to its unlocked state, and vice versa;
- the first locking means further comprises a first manual control means configured to cause the transition of the first locking means from its locked state to its unlocked state and vice versa by a manual action by a user on the first manual control means,
- the first manual control means comprises a handle mounted so as to pivot relative to the substructure about a seventh transverse axis of the seat;
- the second locking means comprises an actuator, and in particular an electric motor, configured to cause the automatic transition of the second locking means from its locked state to its unlocked state, and vice versa;
- the actuator of the first locking means is the actuator of the second locking means;
- the second locking means further comprises a second manual control means configured to cause the transition of the second locking means from its locked state to its unlocked state and vice versa by a manual action by a user on the second manual control means;
- the third locking means comprises:
  - a first locking part integral with the front connecting rod and hinged to the front connecting rod about an eighth transverse axis of the seat, and having a first interlocking part,
  - a second locking part integral with the sector gear and fixed relative to the sector gear, and having a second interlocking part, configured to fit into the first interlocking part of the first locking part so as to prevent rotation of the front connecting rod relative to the sector gear about the fourth transverse axis of the seat, and:
  - the locked state of the third locking means corresponds to at least one locking position of the second locking part relative to the first locking part in which the first interlocking part of the first locking part is fitted into the second interlocking part of the second locking part so as to prevent rotation of the front connecting rod relative to the sector gear about the fourth transverse axis of the seat,
  - the unlocked state of the third locking means corresponds to at least one unlocking position of the second locking part relative to the first locking part in which the first interlocking part of the first locking part is separated from the second interlocking part of the second locking part so as to allow rotation of the front connecting rod relative to the sector gear about the fourth transverse axis of the seat;
- the second locking part is made as one piece with and of the same material as the sector gear;
- the first interlocking part comprises a first recess and/or a first projection, in particular adjacent to the first recess, and the second interlocking part comprises a second projection configured to fit together with the first recess of the first interlocking part with possible interlocking clearance and/or a second recess, in particular adjacent to the second projection, configured to fit together with the first projection of the first interlocking part with possible interlocking clearance;
- the third locking means further comprises: a cam hinged to the front connecting rod so as to pivot about a ninth transverse axis of the seat, and a cam track integral with and fixed relative to the first locking part, and in particular made as one piece with and of the same material as the first locking part, the cam and the cam track being configured to cooperate in order to cause the pivoting of the first locking part relative to the front connecting rod about the eighth transverse axis of the seat between the at least one locking position of the first locking part relative to the second locking part and the at least one unlocking position of the first locking part relative to the second locking part;
- the cam has a first bearing surface and a second bearing surface, and the cam track has a first abutment surface and a second abutment surface, the rotation of the first locking part relative to the front connecting rod about the eighth transverse axis being driven in a first direction of rotation, advantageously corresponding to the transition from the at least one locking position to the at least one unlocking position of the first locking part relative to the second locking part, by the pressing of the first bearing surface of the cam against the first abutment surface of the cam track, and the rotation of the first locking part relative to the front connecting rod about the eighth transverse axis being driven in a second direction of rotation, opposite to the first direction of rotation, advantageously corresponding to the transition from the at least one unlocking position to the at least one locking position of the first locking part relative to the second locking part, by the pressing of the second bearing surface of the cam against the second abutment surface of the cam track;
- the third locking means further comprises a third manual control means configured to cause the transition of the third locking means from its locked state to its unlocked state and vice versa by a manual action by a user on the third manual control means;

the third manual control means of the third locking means comprises the handle of the first manual control means of the first locking means;

the third locking means comprises an actuating part integral with and fixed relative to the cam, and mounted on the front connecting rod so as to pivot about the ninth transverse axis of the seat, the actuating part being connected to the manual control means, for example via a rigid cable, such that a manual action by a user on the third manual control means causes the actuating part to pivot relative to the front connecting rod about the ninth transverse axis of the seat, and the cam to pivot relative to the front connecting rod about the ninth transverse axis of the seat;

the cam and the actuating part are arranged one on either side of the front connecting rod in the transverse direction of the seat, and in particular with the actuating part positioned between the first side edge and the second side edge of the seat base frame in the transverse direction of the seat;

the actuating part has a first arm and a second arm interconnected at a joining area near one of their respective longitudinal ends, for example so as to have substantially an L or V shape, with the first arm fixed to the cam and the second arm connected to the third manual control means, and in particular by means of the rigid cable, the actuating part being hinged to the front connecting rod so as to pivot about the ninth transverse axis of the seat at the joining area between the first arm and the second arm of the actuating part;

the third locking means further comprises an elastic means, for example such as a spring, configured to urge the third locking means into its locked state.

Another aspect of the present disclosure proposes a vehicle comprising a seat according to one of the embodiments of the present disclosure.

Vehicle seat (1) comprising: a seat base frame (2), anchoring means (3) for anchoring to the floor of a vehicle, a backrest (5) pivotably hinged to the seat base frame (2), a substructure (6) pivotably hinged to the anchoring means (3) and to the backrest (5), a front connecting rod (41) pivotably hinged to the anchoring means (3) and to the seat base frame (2), a sector gear (42) pivotably hinged to the anchoring means (3), an irreversible electric motor (M) configured to cause rotation of the sector gear (42) relative to the anchoring means (3), a first locking means (7) for locking the rotation of the substructure (6) relative to the anchoring means (3), a second locking means (8) for locking the rotation of the backrest (5) relative to the substructure (6), a third locking means (9) for locking the rotation of the front connecting rod (41) relative to the sector gear (42).

The invention claimed is:

1. A vehicle seat comprising:
a seat base frame having a front edge and a rear edge interconnected by a first side edge and a second side edge,
anchoring means for anchoring the seat to the floor of a vehicle,
connecting means for connecting the seat base frame to the anchoring means, enabling movement of the seat base frame relative to the anchoring means at least in the longitudinal direction and in the vertical direction of the seat,
a backrest hinged the seat base frame near its rear edge so as to pivot about a first transverse axis of the seat,
a substructure hinged to the anchoring means so as to pivot about a second transverse axis of the seat and hinged to the backrest so as to pivot about a third transverse axis of the seat,
wherein the connecting means comprise:
a front connecting rod having a first longitudinal end and a second longitudinal end, the front connecting rod being hinged to the anchoring means near its first longitudinal end so as to pivot about a fourth transverse axis of the seat and hinged to the seat base frame near its second longitudinal end so as to pivot about a fifth transverse axis of the seat, near its front edge,
a sector gear hinged to the anchoring means so as to pivot about the fourth transverse axis of the seat,
wherein the seat further comprises an irreversible electric motor configured for:
causing rotation of the sector gear relative to the anchoring means about the fourth transverse axis, when activated, and
preventing rotation of the sector gear relative to the anchoring means about the fourth transverse axis, when inactivated,
and wherein the seat further comprises:
a first locking means able to transition:
from a locked state, in which the first locking means prevents rotation of the substructure relative to the anchoring means of the seat about the second transverse axis, to
an unlocked state, in which the first locking means allows rotation of the substructure relative to the anchoring means of the seat about the second transverse axis, and vice versa,
a second locking means able to transition:
from a locked state, in which the second locking means prevents rotation of the backrest relative to the substructure about the third transverse axis, to
an unlocked state, in which the second locking means allows rotation of the backrest relative to the substructure about the third transverse axis, and vice versa,
a third locking means able to transition:
from a locked state, in which the third locking means prevents rotation of the front connecting rod relative to the sector gear about the fourth transverse axis by fixedly connecting the front connecting rod to the sector gear, to
an unlocked state, in which the third locking means allows rotation of the front connecting rod relative to the sector gear about the fourth transverse axis, and vice versa.

2. The vehicle seat of claim 1, wherein the first locking means comprises an actuator configured to cause the automatic transition of the first locking means from its locked state to its unlocked state, and vice versa.

3. The vehicle seat of claim 1, wherein the first locking means further comprises a first manual control means configured to cause the transition of the first locking means from its locked state to its unlocked state and vice versa by a manual action by a user on the first manual control means.

4. The vehicle seat of claim 3, wherein the first manual control means comprises a handle mounted so as to pivot relative to the substructure about a seventh transverse axis of the seat.

5. The vehicle seat of claim 1, wherein the second locking means comprises an actuator configured to cause the automatic transition of the second locking means from its locked state to its unlocked state, and vice versa.

6. The vehicle seat of claim 5, wherein the first locking means comprises an actuator configured to cause the automatic transition of the first locking means from its locked state to its unlocked state, and vice versa and wherein the actuator of the first locking means is the actuator of the second locking means.

7. The vehicle seat of claim 5, wherein the second locking means further comprises a second manual control means configured to cause the transition of the second locking means from its locked state to its unlocked state and vice versa by a manual action by a user on the second manual control means.

8. The vehicle seat of claim 1, wherein the third locking means comprises:
a first locking part integral with the front connecting rod and hinged to the front connecting rod about an eighth transverse axis of the seat, and having a first interlocking part,
a second locking part integral with the sector gear and fixed relative to the sector gear, and having a second interlocking part, configured to fit into the first interlocking part of the first locking part so as to prevent rotation of the front connecting rod relative to the sector gear about the fourth transverse axis of the seat, and wherein:
the locked state of the third locking means corresponds to at least one locking position of the second locking part relative to the first locking part in which the first interlocking part of the first locking part is fitted into the second interlocking part of the second locking part so as to prevent rotation of the front connecting rod relative to the sector gear about the fourth transverse axis of the seat,
the unlocked state of the third locking means corresponds to at least one unlocking position of the second locking part relative to the first locking part in which the first interlocking part of the first locking part is separated from the second interlocking part of the second locking part so as to allow rotation of the front connecting rod relative to the sector gear about the fourth transverse axis of the seat.

9. The vehicle seat of claim 8, wherein the second locking part is made as one piece with and of the same material as the sector gear.

10. The vehicle seat of claim 8, wherein:
the first interlocking part comprises a first recess and/or a first projection,
the second interlocking part comprises a second projection configured to fit into the first recess of the first interlocking part with possible interlocking clearance and/or a second recess configured to fit together with the first projection of the first interlocking part with possible interlocking clearance.

11. The vehicle seat of claim 8, wherein the third locking means further comprises:
a cam hinged to the front connecting rod so as to pivot about a ninth transverse axis of the seat, and
a cam track integral with and fixed relative to the first locking part and wherein the cam and the cam track are configured to cooperate in order to cause the pivoting of the first locking part relative to the front connecting rod about the eighth transverse axis of the seat between the at least one locking position of the first locking part relative to the second locking part and the at least one unlocking position of the first locking part relative to the second locking part.

12. The vehicle seat of claim 11, wherein:
the cam has a first bearing surface and a second bearing surface, and
the cam track has a first abutment surface and a second abutment surface, and wherein:
the rotation of the first locking part relative to the front connecting rod about the eighth transverse axis is driven in a first direction of rotation, advantageously corresponding to the transition from the at least one locking position into the at least one unlocking position of the first locking part relative to the second locking part, by the pressing of the first bearing surface of the cam against the first abutment surface of the cam track, and
the rotation of the first locking part relative to the front connecting rod about the eighth transverse axis is driven in a second direction of rotation, opposite to the first direction of rotation, advantageously corresponding to the transition from the at least one unlocking position to the at least one locking position of the first locking part relative to the second locking part, by the pressing of the second bearing surface of the cam against the second abutment surface of the cam track.

13. The vehicle seat of claim 8, wherein the third locking means further comprises a third manual control means configured to cause the transition of the third locking means from its locked state into its unlocked state and vice versa by a manual action by a user on the third manual control means.

14. The vehicle seat of claim 4, wherein the third locking means further comprises a third manual control means configured to cause the transition of the third locking means from its locked state into its unlocked state and vice versa by a manual action by a user on the third manual control means and wherein the third manual control means of the third locking means comprises the handle of the first manual control means of the first locking means.

15. The vehicle seat of claim 13, wherein the third locking means comprises an actuating part integral with and fixed relative to the cam, and mounted on the front connecting rod so as to pivot about the ninth transverse axis of the seat, the actuating part being connected to the manual control means, for example via a rigid cable, such that a manual action by a user on the third manual control means causes the actuating part to pivot relative to the front connecting rod about the ninth transverse axis of the seat, and therefore the cam to pivot relative to the front connecting rod about the ninth transverse axis of the seat.

16. The vehicle seat of claim 15, wherein the cam and the actuating part are arranged one on either side of the front connecting rod in the transverse direction of the seat, and with the actuating part positioned between the first side edge and the second side edge of the seat base frame in the transverse direction of the seat.

17. The vehicle seat of claim 15, wherein the actuating part has a first arm and a second arm interconnected at a joining area near one of their respective longitudinal ends, for example so as to have substantially an L or V shape, with the first arm fixed to the cam and the second arm connected to the third manual control means, the actuating part being hinged to the front connecting rod so as to pivot about the ninth axis transverse of the seat at the joining area between the first arm and the second arm of the actuating part.

18. The vehicle seat of claim 1, wherein the third locking means further comprises an elastic means configured to urge the third locking means into its locked state.

19. A vehicle comprising the seat of claim 1.

* * * * *